United States Patent
Iwamoto et al.

(10) Patent No.: US 6,844,539 B2
(45) Date of Patent: Jan. 18, 2005

(54) TOUCH LOCATION BY RETROFLECTED SCANNED OPTICAL BEAMS

(75) Inventors: Yasuhide Iwamoto, Kawasaki (JP);
Satoshi Sano, Kawasaki (JP);
Fumihiko Nakazawa, Kawasaki (JP);
Nobuyasu Yamaguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 59 days.

(21) Appl. No.: 10/252,555

(22) Filed: Sep. 24, 2002

(65) Prior Publication Data

US 2003/0020008 A1 Jan. 30, 2003

Related U.S. Application Data

(63) Continuation of application No. PCT/JP00/02490, filed on Apr. 14, 2000.

(51) Int. Cl.[7] .............................................. H01J 40/14
(52) U.S. Cl. .................................. 250/221; 250/559.12
(58) Field of Search .......................... 250/559.12, 221, 250/222.1; 345/156, 157, 158, 166, 173, 174, 175

(56) References Cited

U.S. PATENT DOCUMENTS

| | | | | | |
|---|---|---|---|---|---|
| 4,507,557 | A | * | 3/1985 | Tsikos ...................... | 250/341.7 |
| 4,692,809 | A | * | 9/1987 | Beining et al. ............. | 348/712 |
| 4,763,903 | A | * | 8/1988 | Goodwin et al. ........... | 273/371 |
| 4,811,004 | A | * | 3/1989 | Person et al. ............... | 345/175 |
| 4,980,547 | A | * | 12/1990 | Griffin ........................ | 250/221 |
| 5,148,016 | A | * | 9/1992 | Murakami et al. .......... | 250/221 |
| 5,196,835 | A | | 3/1993 | Blue et al. | |
| 5,298,737 | A | * | 3/1994 | Proper ........................ | 250/221 |
| 5,317,140 | A | * | 5/1994 | Dunthorn .................... | 250/221 |
| 5,764,223 | A | * | 6/1998 | Chang et al. ............... | 345/175 |
| 5,789,739 | A | * | 8/1998 | Schwarz ..................... | 250/221 |
| 6,100,538 | A | * | 8/2000 | Ogawa ................... | 250/559.29 |
| 6,268,868 | B1 | * | 7/2001 | Yamaguchi et al. ........ | 345/619 |
| 6,362,468 | B1 | * | 3/2002 | Murakami et al. .......... | 250/221 |
| 6,441,362 | B1 | * | 8/2002 | Ogawa ....................... | 250/221 |
| 6,480,187 | B1 | * | 11/2002 | Sano et al. ................. | 345/175 |
| 6,492,633 | B2 | * | 12/2002 | Nakazawa et al. ......... | 250/221 |
| 6,498,602 | B1 | * | 12/2002 | Ogawa ....................... | 345/173 |
| 2001/0002694 | A1 | * | 6/2001 | Nakazawa et al. ......... | 250/221 |
| 2001/0028344 | A1 | * | 10/2001 | Iwamoto et al. ........... | 345/175 |
| 2001/0055006 | A1 | * | 12/2001 | Sano et al. ................. | 345/175 |
| 2002/0050985 | A1 | * | 5/2002 | Takekawa et al. ......... | 345/173 |
| 2002/0162949 | A1 | * | 11/2002 | Iwamoto et al. ........... | 250/221 |

FOREIGN PATENT DOCUMENTS

| | | |
|---|---|---|
| JP | 57-211637 | 12/1982 |
| JP | 60-149984 | 8/1985 |
| JP | 62-5428 | 1/1987 |
| JP | 62-500889 | 4/1987 |
| JP | 62-32491 | 7/1987 |
| JP | 63-146013 | 6/1988 |
| JP | 2-39315 | 2/1990 |
| JP | 2-85916 | 3/1990 |
| JP | 2-116918 | 5/1990 |
| JP | 3-127218 | 5/1991 |
| JP | 10-20021 | 1/1998 |
| JP | 11-249799 | 9/1999 |

* cited by examiner

*Primary Examiner*—Que T. Le
(74) *Attorney, Agent, or Firm*—Armstrong, Kratz, Quintos, Hanson & Brooks, LLP

(57) ABSTRACT

The position of a light blocking object is detected not only within a display screen, but also outside the display screen. With the use of the function of detecting the position in a region outside the display screen, it becomes possible to provide virtual buttons in this region and detect dust around a light retro-reflector. Dirt on the light retro-reflector is detected based on the levels of light receiving signals of optical units.

4 Claims, 32 Drawing Sheets

FIG. 1
(a)
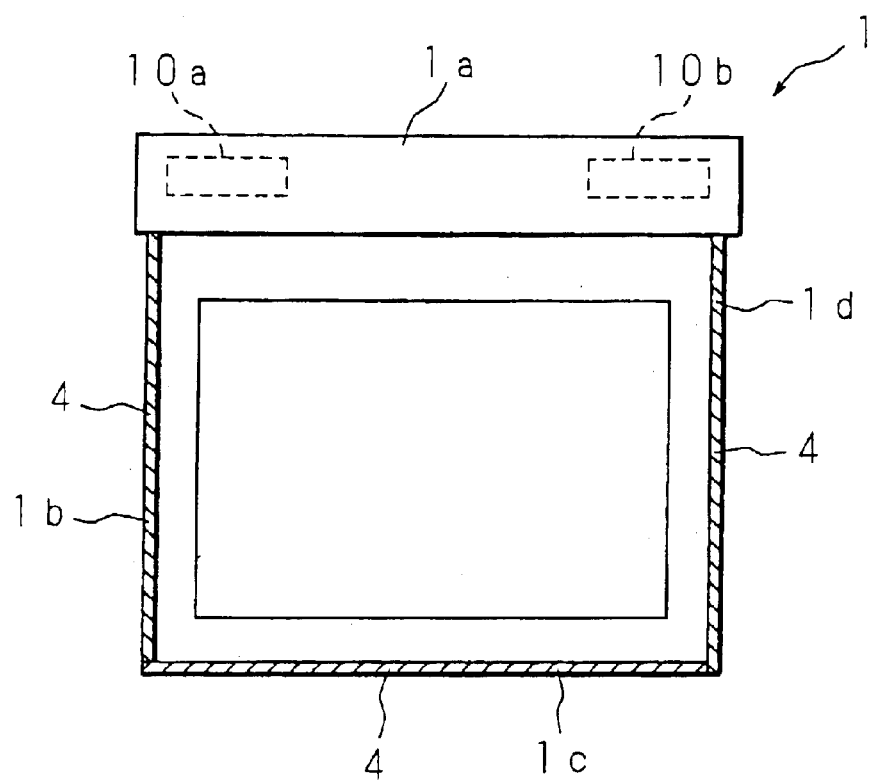
(b)
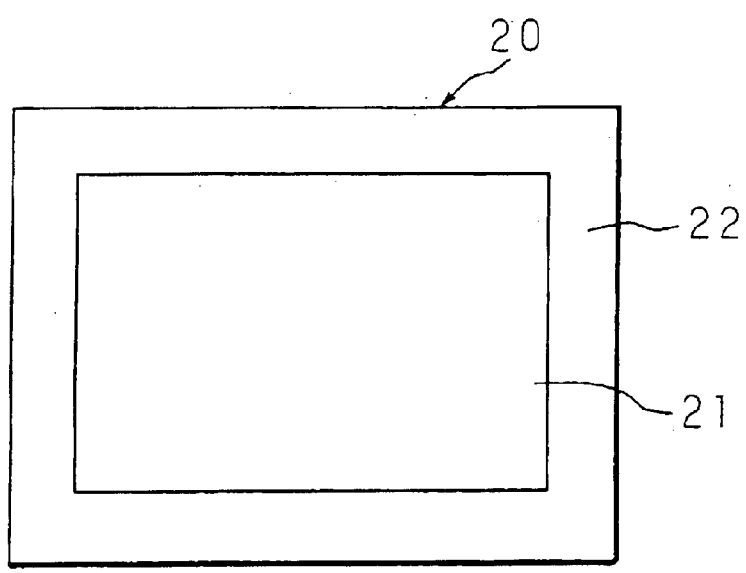

$$\begin{pmatrix} Px(\theta,\phi) \\ Py(\theta,\phi) \end{pmatrix} = \begin{pmatrix} \dfrac{\tan\phi}{\tan\theta+\tan\phi}L \\ \dfrac{\tan\theta\tan\phi}{\tan\theta+\tan\phi}L \end{pmatrix}$$

$$\begin{pmatrix} Pcx(\theta,\phi) = Pcx(\theta 1 + \frac{1}{2}d\theta, \phi 1 + \frac{1}{2}d\phi) \\ Pcy(\theta,\phi) = Pcy(\theta 1 + \frac{1}{2}d\theta, \phi 1 + \frac{1}{2}d\phi) \end{pmatrix}$$

D1, D2: DIAMETER OF CROSS SECTION OF LIGHT BLOCKING OBJECT $$\begin{cases} OP_c = r1 = \sqrt{P_{cx}^2 + P_{cy}^2} \\ BP_c = r2 = \sqrt{(L-P_{cx})^2 + P_{cy}^2} \end{cases}$$

$$\begin{cases} D1 = 2 \cdot r1 \cdot \sin\frac{1}{2}d\theta = 2\sqrt{P_{cx}^2 + P_{cy}^2} \cdot \sin\frac{1}{2}d\theta \\ D2 = 2 \cdot r2 \cdot \sin\frac{1}{2}d\phi = 2\sqrt{(L-P_{cx})^2 + P_{cy}^2} \cdot \sin\frac{1}{2}d\phi \end{cases}$$

FIG. 12
(a)
OPTICAL UNIT 10a
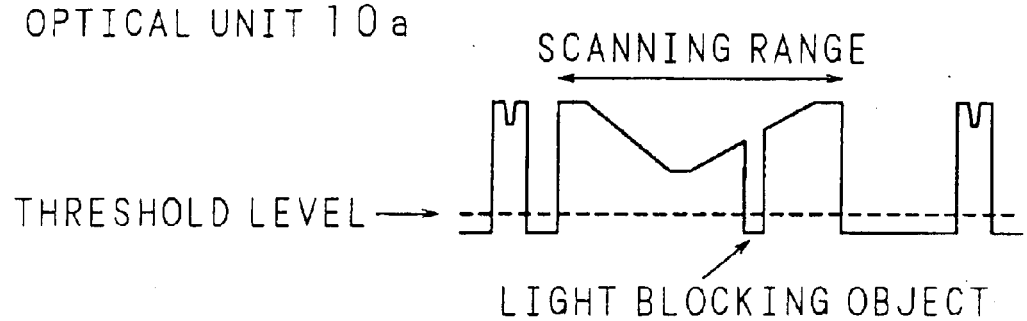
(b)
OPTICAL UNIT 10b
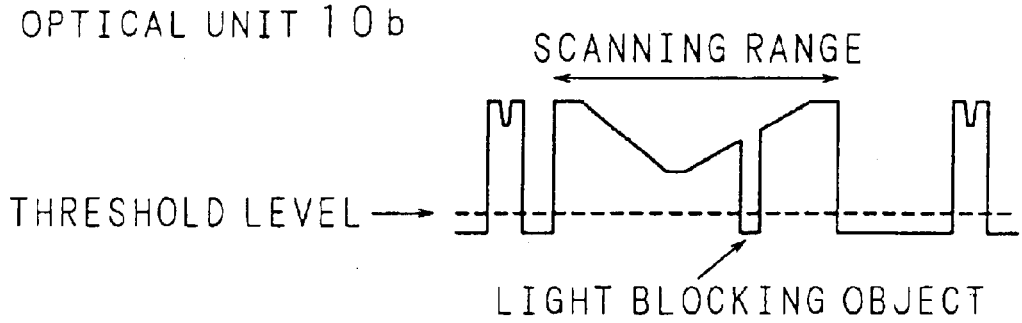

FIG. 14
(a)
OPTICAL UNIT 10a
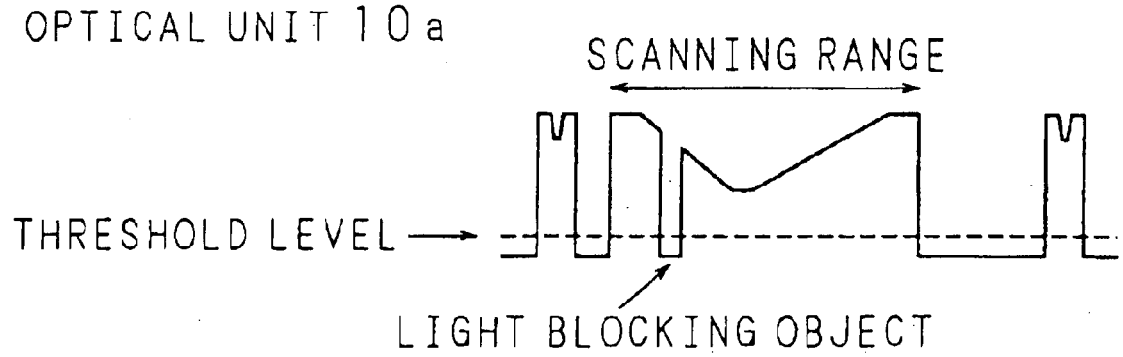
THRESHOLD LEVEL →
LIGHT BLOCKING OBJECT
(b)
OPTICAL UNIT 10b
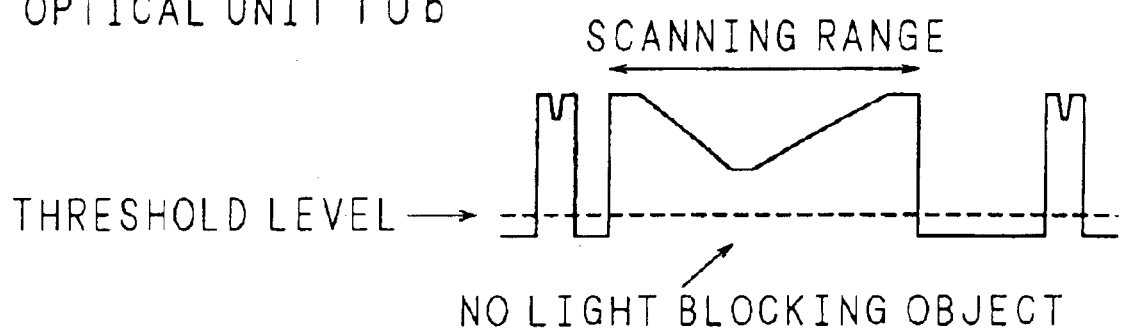
THRESHOLD LEVEL →
NO LIGHT BLOCKING OBJECT FIG. 24
(a) OPTICAL UNIT 10a
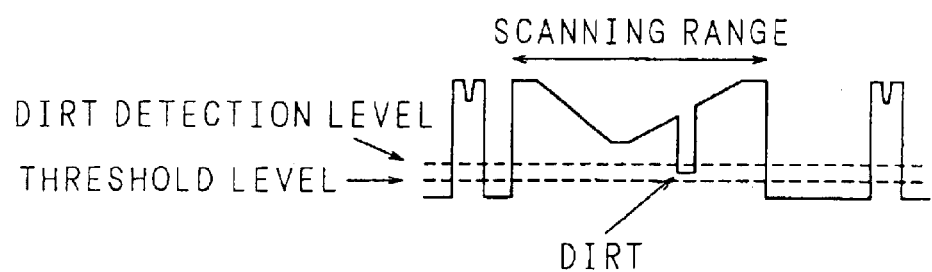
(b) OPTICAL UNIT 10b
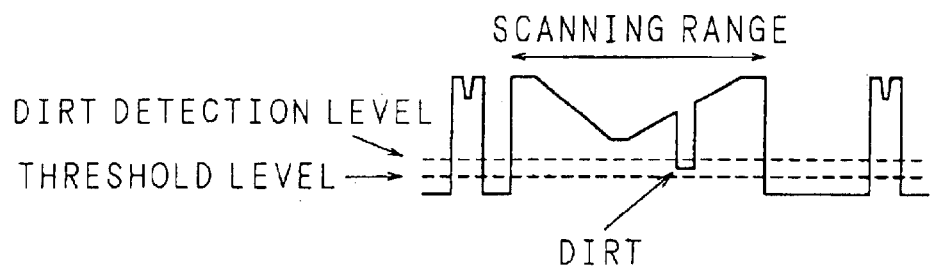

FIG. 29
(a)
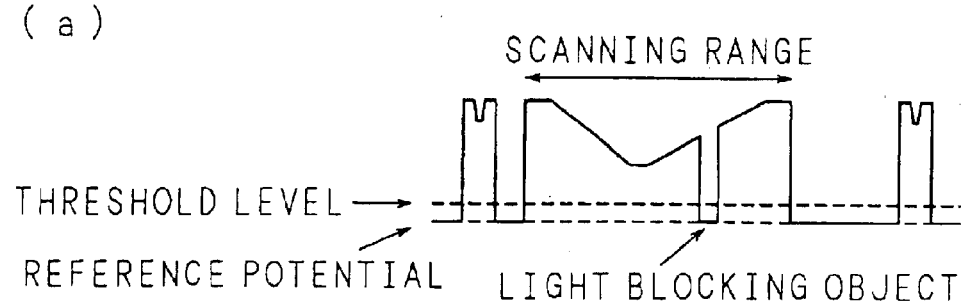
(b)
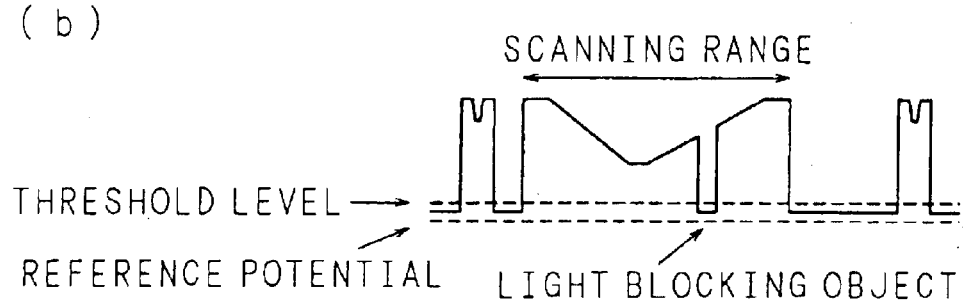

TOUCH LOCATION BY RETROFLECTED SCANNED OPTICAL BEAMS

This application is a continuation of PCT International Application No. PCT/JP00/02490 which has an International filing date of Apr. 14, 2000, which designated the United States of America.

TECHNICAL FIELD

The present invention relates to an optical position detecting device for optically detecting the position of a light blocking object by using an optical scanning system and a light retro-reflector, and also relates to a recording medium on which an operational program for the optical position detecting device is recorded.

BACKGROUND ART

With the spread of computer systems, mainly personal computers, there has been used a device for inputting new information or giving various instructions to a computer system by pointing at a position on a display screen of a display apparatus on which information is displayed by the computer system, with an indicating object such as a person's finger or a specific tool. In order to perform an input operation with respect to the information displayed on the display screen of the display apparatus of a personal computer or the like by a touching method, it is necessary to detect a touched position (indicated position) on the display screen with high accuracy.

As one example of a device for detecting such an indicated position on the display screen that functions as a coordinate surface, Japanese Patent Application Publication No. 62-32491(1987) discloses an optical position detecting device. This device comprises: an indicating member for pointing at a position on a display screen; at least two optical scanners for emitting scanning light across the display screen; reflecting means for reflecting the scanning light; and means for detecting a time at which the scanning light struck the indicating member, and detects the position of the indicating member on the display screen, based on the relation between the optical scanning start time or end time of the optical scanners and the time at which the scanning light struck the indicating member.

Besides, another optical position detecting device is disclosed in Japanese Patent Application Laid-Open No. 57-211637(1982). This device angularly scans converged light such as a laser beam from the outside of the display screen, calculates angles of a position where a special pen including reflecting means is present from two timings of reflected light from the special pen respectively, and detects the coordinates of the position from the calculated angles using the triangulation principle.

Further, still another optical position detecting device is proposed in Japanese Patent Application Laid-Open No. 62-5428(1987). In this device, light retro-reflectors are positioned as reflecting means on both side frames of the display screen, return light of an angularly scanned laser beam from the light retro-reflectors is detected, an angle of a position where a finger or a pen is present is calculated from a timing that the light beam is blocked by the finger or the pen, and the coordinates of the position is detected from the calculated angles using the triangulation principle.

In an optical position detecting device, when the reflecting means for the scanning light is dirty or when the reflecting means has dust thereon, a proper detecting operation is not performed. However, none of the conventional optical position detecting devices as described above has the function to detect such dirt and dust, and thus there is a problem that operational defects due to such dirt and dust easily occur.

Further, the conventional optical position detecting device including the light retro-reflector detects only a position within the display screen, and thus has a problem that a region between the display screen and the light retro-reflector can not be used effectively.

The present invention has been made with the aim of solving the above problems, and it is an object of the present invention to provide an optical position detecting device capable of using the region outside the display screen effectively, and a recording medium on which the operational program for the same is recorded.

Another object of the present invention is to provide an optical position detecting device capable of detecting dirt on a light retro-reflector and/or dust on or around the light retro-reflector, and a recording medium on which the operational program for the same is recorded.

Still another object of the present invention is to provide an optical position detecting device capable of detecting dirt on a light retro-reflector and/or dust on or around the light retro-reflector and thereby preventing an operational defect caused by such dirt and/or dust, and a recording medium on which the operational program for the same is recorded.

Yet another object of the present invention is to provide an optical position detecting device capable of readily detecting an operational defect of an optical scanning unit (polygon mirror) and thereby enabling a stable operation of the position detection process.

A further object of the present invention is to provide an optical position detecting device capable of detecting dirt on a cover, covering an optical transceiver.

DISCLOSURE OF THE INVENTION

In the first aspect, a detection of the position of a light blocking object is performed not only within a predetermined region (display screen), but also in a range outside the predetermined region (a region between the predetermined region and a light retro-reflector) in the same manner as in the predetermined region. Therefore, the range outside the predetermined region can be used effectively, and, for example, a virtual button can be provided in the range.

In the second aspect, dust on or around the light retro-reflector is detected based on the position of the light blocking object calculated based on the results of receiving returned reflected light and the continuing time during which the light receiving level is decreased due to the light blocking object. More specifically, when the calculated position of the light blocking object agrees with the position of the light retro-reflector or is in the vicinity thereof and the decrease in the light receiving level caused by the light blocking object continues for a predetermined time or more, it is judged that dust is present. Accordingly, since dust in the vicinity of the light retro-reflector can be detected, it is possible to prevent an operational defect caused by the dust.

In the third aspect, dirt on the light retro-reflector is detected based on the light receiving level of returned reflected light. More specifically, the light retro-reflector is judged to be dirty if the light receiving level is lower than a level obtained when a light blocking object is present and higher than a level obtained when no object is present. Accordingly, since dirt on the light retro-reflector can be detected, it is possible to prevent an operational defect caused by the dirt.

In the fourth aspect, when the light receiving level of returned reflected light attenuates periodically, it is detected that an optical scanning unit (polygon mirror) has an operational defect. Accordingly, it is possible to take countermeasures promptly and perform the position detection process in a stable manner.

In the fifth aspect, when an optical transceiver is covered with a cover, dirt on the cover is detected based on the base potential of a light receiving signal of returned reflected light. More specifically, the cover is judged to be dirty if the base potential is higher than a predetermined value. Accordingly, it is possible to prevent an operational defect caused by the dirt.

BRIEF DESCRIPTION OF THE DRAWINGS

FIG. 1(a) is a front view of an optical position detecting device; FIG. 1(b) is a front view of a display apparatus;

FIGS. 12(a) and 12(b) are views showing the light receiving signals of the optical units in the state shown in FIG. 11;

FIGS. 14(a) and 14(b) are views showing the light receiving signals of the optical units in the state shown in FIG. 13;

FIGS. 24(a) and 24(b) are views showing the light receiving signals of the optical units in the state shown in FIG. 23;

FIGS. 29(a) and 29(b) are views showing the light receiving signals of the optical units in the state shown in FIG. 28;

BEST MODE FOR IMPLEMENTING THE INVENTION

Figure 2:
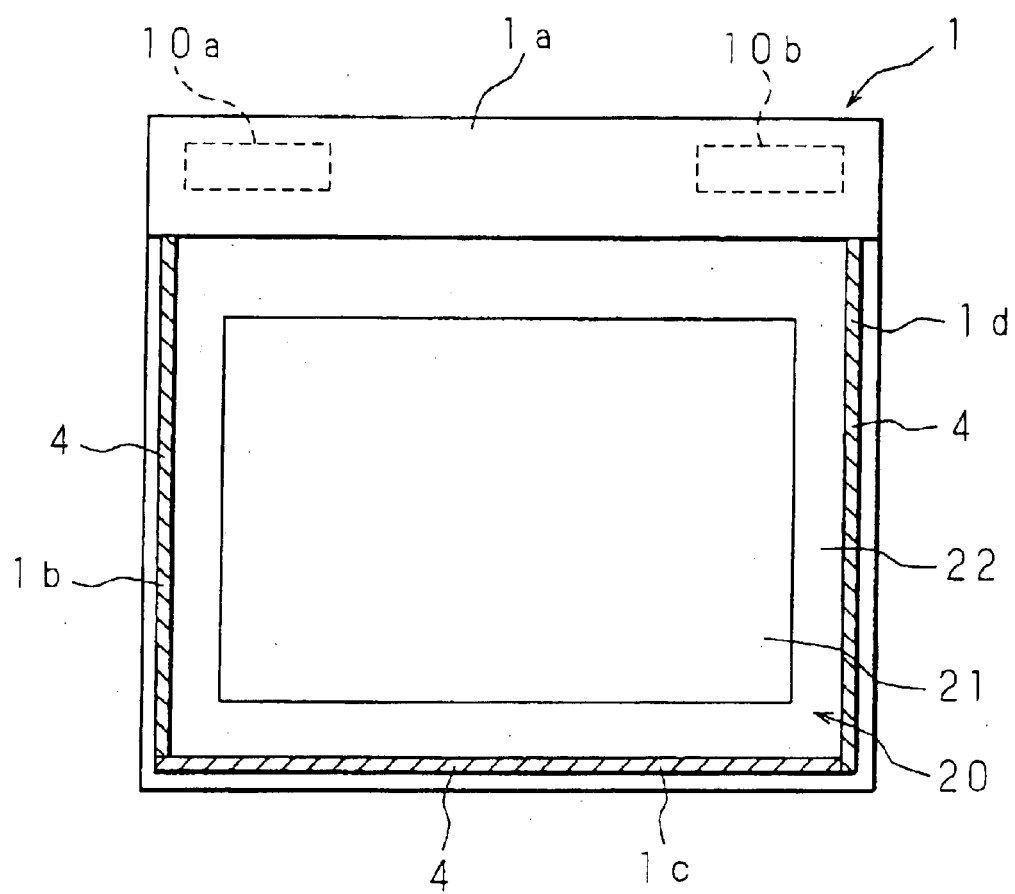
FIG. 2 is a front view showing a state in which the optical position detecting device is externally mounted on the display apparatus.

The following description will describe the present invention in detail with reference to the drawings illustrating some embodiments thereof.

FIG. 1(a) is a front view of an optical position detecting device. This optical position detecting device 1 as a whole is in the form of a hollow rectangular parallelepiped body with no rid and bottom, and comprises four side frames 1a, 1b, 1c and 1d. In FIG. 1(a), the upper side frame 1a has a larger width compared to other three side frames 1b, 1c and 1d, and incorporates optical units 10a and 10b having a later-described internal structure in both ends thereof. Moreover, the three side frames 1b, 1c and 1d are provided with light retro-reflectors 4.

FIG. 1(b) is a front view of a display apparatus, and the flat parallelepiped display apparatus 20 comprises a display screen 21 and a screen frame 22 on which the display screen 21 is mounted. The optical position detecting device 1 having the above-described structure is externally mounted on such a display apparatus 20. FIG. 2 is a front view showing a state in which the optical position detecting device 1 is externally mounted on the display apparatus 20.

Figure 3:
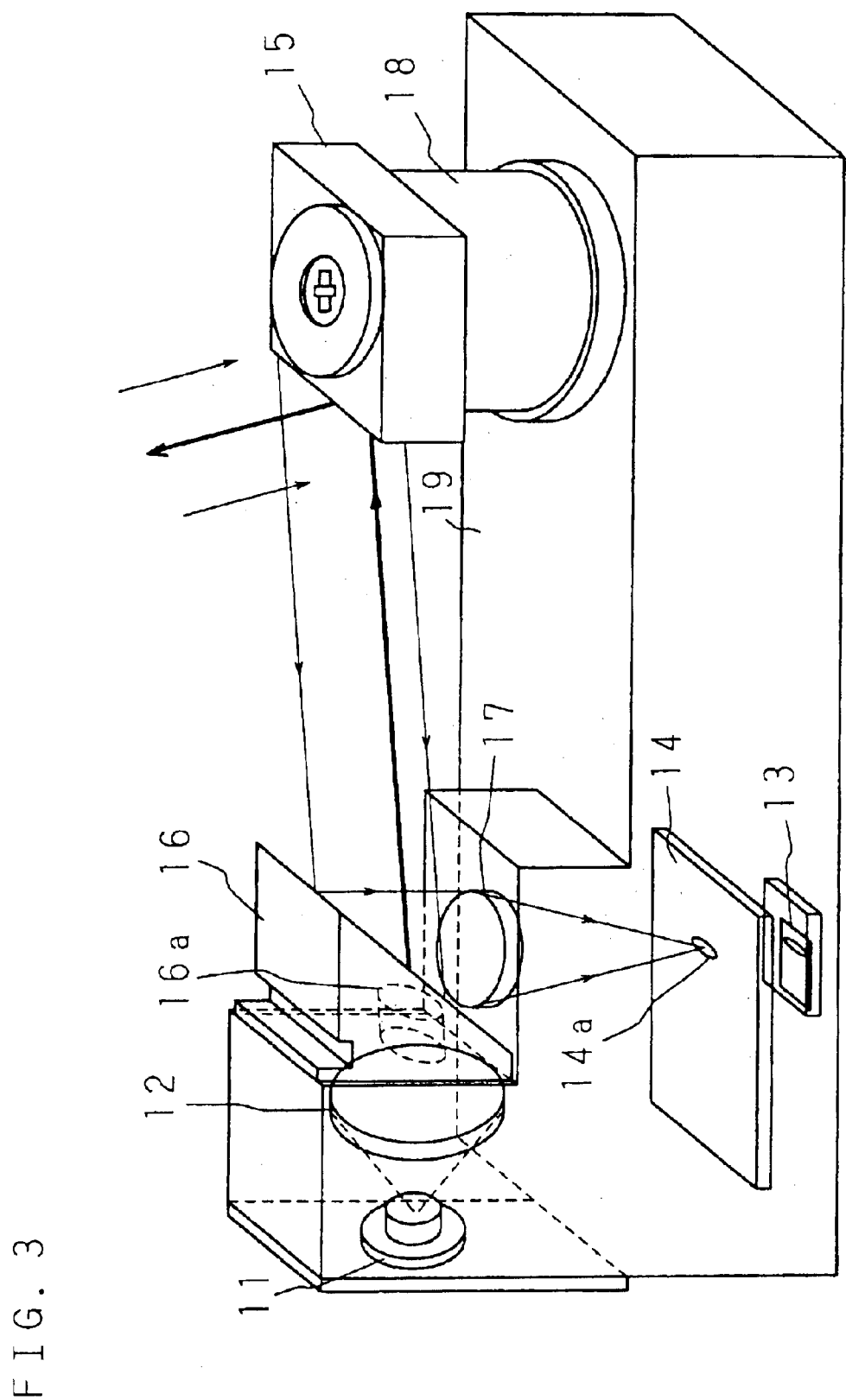
FIG. 3 is a view showing the structure and optical path of an optical unit.

FIG. 3 is a view showing the structure of optical units 10a, 10b and the optical path. Both of the optical units 10a and 10b have the same internal structure. The optical unit 10a (10b) includes a light emitting element 11 composed of a laser diode (LD) for emitting infrared laser light; a collimation lens 12 for making the laser light from the light emitting element 11 parallel light; a light receiving element 13 composed of a photodiode (PD) for receiving reflected light from the light retro-reflector 4; a light blocking member 14 having an aperture 14a for limiting the incident light on the light receiving element 13; a polygon mirror 15 having the shape of a square column, for example, for angularly scanning the laser light from the light emitting element 11; an aperture mirror 16 for limiting light to be projected from the collimation lens 12 to the polygon mirror 15 by an aperture 16a and for reflecting light reflected from the light retro-reflector 4 through the polygon mirror 15 toward the light receiving element 13; a condenser lens 17 for focusing the reflected light from the aperture mirror 16; a motor 18 for rotating the polygon mirror 15; and an optical unit main body 19 on which these members are mounted and fixed.

After the laser light emitted from the light emitting element 11 is made parallel light by the collimation lens 12 and passes through the aperture 16*a* of the aperture mirror 16, it is angularly scanned in a plane substantially orthogonal to the side frames 1*a*, 1*b*, 1*c* and 1*d* of the optical position detecting device 1 with the rotation of the polygon mirror 15, and then projected onto the light retro-reflector 4. After the reflected light from the light retro-reflector 4 is reflected by the polygon mirror 15 and the aperture mirror 16, it is focused by the condenser lens 17, passes through the aperture 14*a* of the light blocking member 14, and enters the light receiving element 13. However, if an object is present in the path of the scanning light, the scanning light is blocked, and therefore the reflected light does not enter the light receiving element 13.

Figure 4:
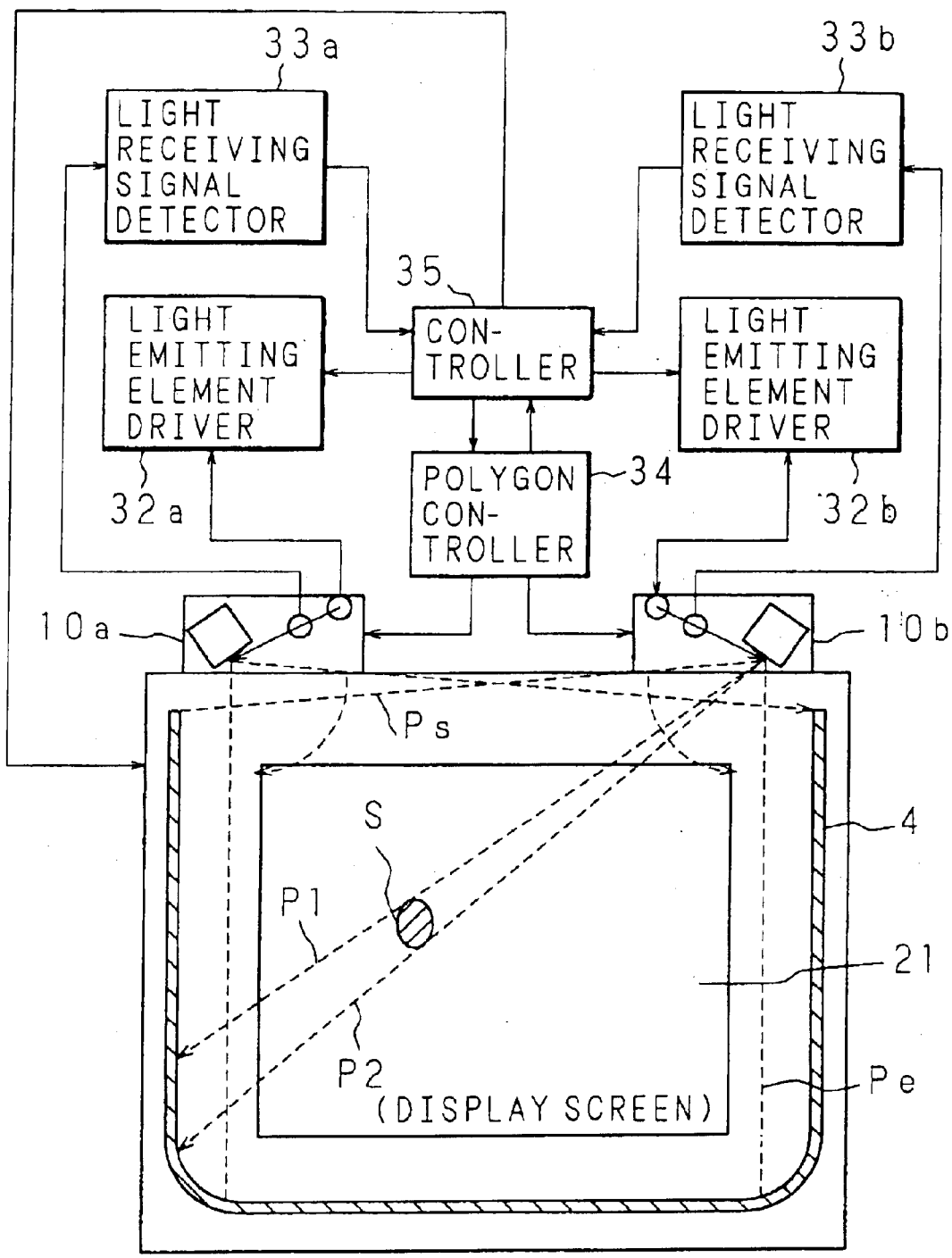
FIG. 4 is a view showing the circuit structure connected to the optical units and the processing state of a position detection.

FIG. 4 is a view showing the circuit structure connected to the optical units 10*a*, 10*b* and the processing state of position detection.

Connected to the optical units 10*a* and 10*b* are light emitting element drivers 32*a* and 32*b* for driving the respective light emitting elements 11; light receiving signal detectors 33*a* and 33*b* for converting the quantity of light received by the respective light receiving elements 13 into electric signals; and a polygon controller 34 for controlling the operations of the respective polygon mirrors 15.

The controller 35 transmits drive control signals to the light emitting element drivers 32*a* and 32*b*. According to the drive control signals, the light emitting element drivers 32*a* and 32*b* are driven, and the light emitting operations of the respective light emitting elements 11 are controlled. The light receiving signal detectors 33*a* and 33*b* transmit the light receiving signals of the reflected light of the respective light receiving elements 13 to the controller 35. Based on the light receiving signals from the respective light receiving elements 13, the controller 35 performs the process of calculating the position and size of a light blocking object S, such as a finger and a pen, the process of detecting dirt on the light retro-reflector 4, the process of detecting dust around the light retro-reflector 4, etc. and also controls the overall operations of the device.

Figure 5:
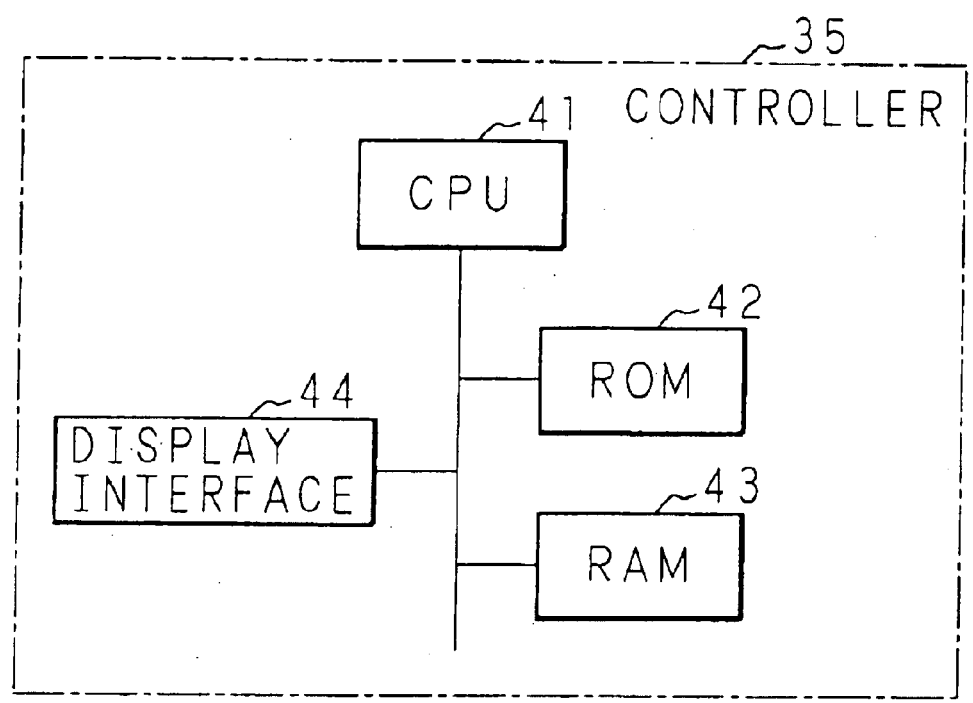
FIG. 5 is a block diagram showing the structure of a controller.

FIG. 5 is a structural diagram of the controller 35. The controller 35 includes a CPU 41, a ROM 42, a RAM 43, and a display interface 44. The CPU 41 is connected with these hardware parts and controls them, and also performs various software functions according to computer programs stored in the ROM 42. On the ROM 42, various software programs necessary for performing the operations of the processes of the optical position detecting device were stored beforehand. The RAM 43 is composed of SRAM, or flash memory or the like, and stores temporary data generated during the execution of software, threshold levels necessary for executing the software, etc. Besides, the display interface 44 controls the display of messages on the display apparatus 20 directed to the user.

Next, the following description will explain the position detection operation. As shown in FIG. 4, if the explanation is given with respect to the optical unit 10*b*, for example, the projected light from the optical unit 10*b* is scanned in a counterclockwise direction on FIG. 4 from a position where the projected light directly enters its light receiving element 13 to a position (Ps) where the projected light is reflected by an end of the light retro-reflector 4, that is, a scanning start position. Then, the projected light is reflected by the light retro-reflector 4 until it comes to a position (P1) where the projected light reaches one end of the light blocking object S, but the projected light is blocked by the light blocking object S up to a position (P2) where it reaches the other end of the light blocking object S, and then the projected light is reflected by the light retro-reflector 4 until it comes to a scanning end position (Pe).

Figure 6:
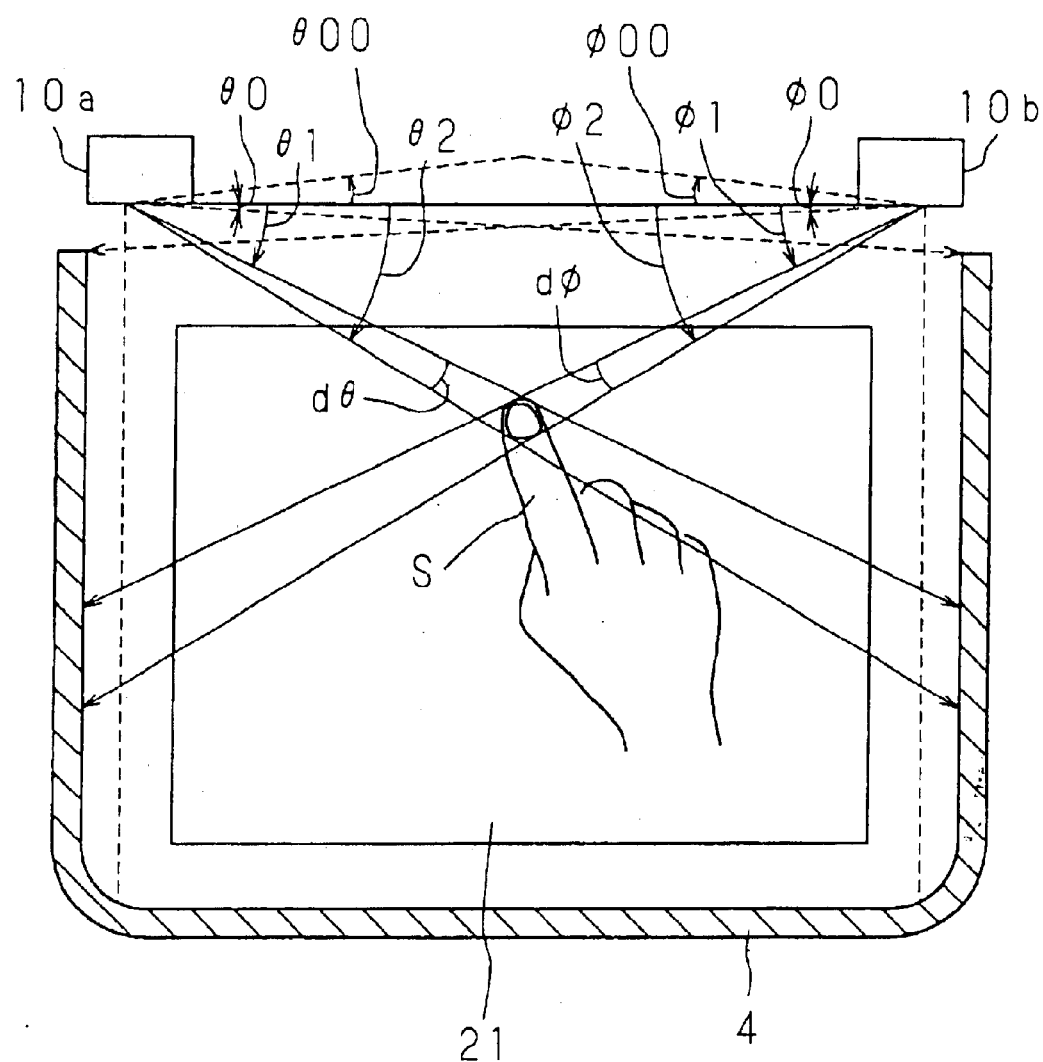
FIG. 6 is a schematic diagram showing the principle of calculating the position and size of a light blocking object.

Next, the following description will explain specific operations for calculating the position and size of the light blocking object S. FIG. 6 is a schematic diagram showing the calculation principle. In FIG. 6, however, illustration of the component members other than the optical units 10*a*, 10*b*, light retro-reflector 4 and display screen 21 is omitted. Further, FIG. 6 shows an example in which a finger is used as the light blocking object S.

The controller 35 controls the polygon controller 34 to rotate the respective polygon mirrors 15 in the optical units 10*a* and 10*b*, and thereby angularly scanning the laser light from the respective light emitting elements 11. As a result, the reflected light from the light retro-reflector 4 enters the respective light receiving elements 13. The quantity of the received light that entered the respective light receiving elements 13 as mentioned above is obtained as the light receiving signals which are the outputs of the light receiving signal detectors 33*a* and 33*b*.

Besides, in FIG. 6, $\theta 00$ and $\phi 00$ represent the angles from a reference line that connects the two optical units 10*a* and 10*b* together to the light receiving elements, respectively; $\theta 0$ and $\phi 0$ represent the angles from the reference line connecting the two optical units 10*a* and 10*b* together to the ends of the light retro-reflector 4; $\theta 1$ and $\phi 1$ represent the angles from the reference line to one end of the light blocking object S on the reference line side; and $\theta 2$ and $\phi 2$ represent the angles from the reference line to the other end of the light blocking object S on the side opposite to the reference line.

If the light blocking object S is present on the optical path of the scanning light on the display screen 21, the light projected from the optical units 10*a* and 10*b* and then reflected by the light blocking object S does not enter the respective light receiving elements 13. Therefore, in a condition as shown in FIG. 6, the reflected light does not enter the light receiving element 13 in the optical unit 10*a* when the scanning angle is in a range between 0° and $\theta 0$; the reflected light enters the light receiving element 13 when the scanning angle is in a range between $\theta 0$ and $\theta 1$; and the reflected light does not enter the light receiving element 13 when the scanning angle is in a range between $\theta 1$ and $\theta 2$. Similarly, the reflected light does not enter the light receiving element 13 in the optical unit 10*b* when the scanning angle is in a range between 0° and $\phi 0$; the reflected light enters the light receiving element 13 when the scanning angle is in a range between $\phi 0$ and $\phi 1$, and the reflected light does not enter the light receiving element 13 when the scanning angle is in a range between $\phi 1$ and $\phi 2$.

Figure 7:
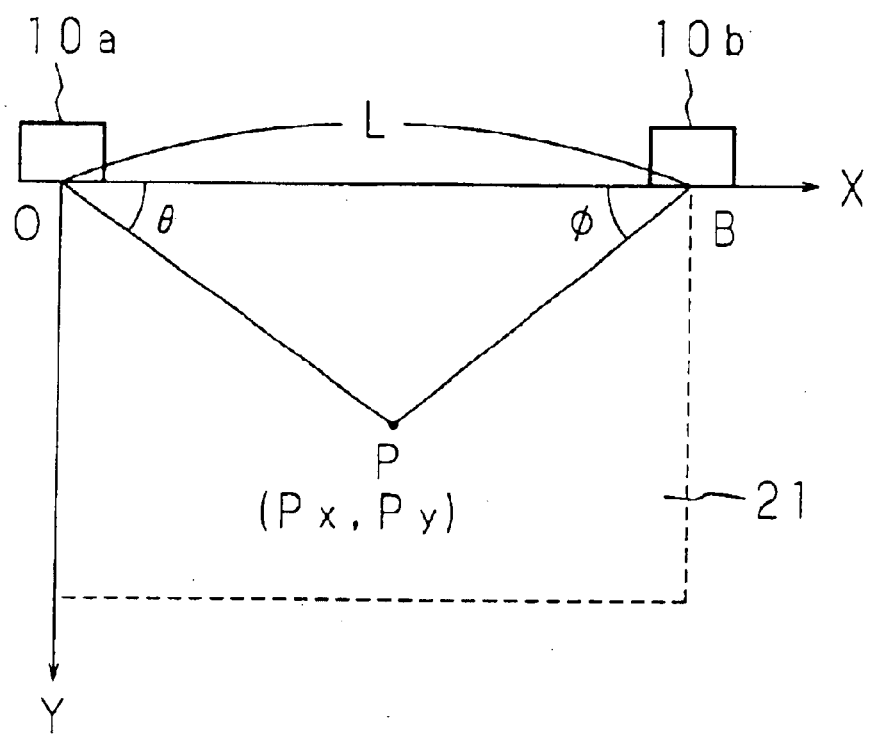
FIG. 7 is a schematic diagram showing the triangulation principle for detecting coordinates.

Next, the following description will explain the process of calculating coordinates of a central position (indicated position) of the light blocking object S (a finger in this example) from the blocked range calculated in the above-mentioned manner. First, conversion of angles into orthogonal coordinates based on the triangulation will be explained. As shown in FIG. 7, the position of the optical unit 10*a* is set as an origin O, the upper side and left side of the display screen 21 are set as the X-axis and Y-axis, and the length of the reference line (the distance between the optical units 10*a* and 10*b*) is set as L. Moreover, the position of the optical unit 10b is set as B. When a central point P (Px, Py) indicated by the light blocking object S on the display screen 21 is positioned at angles θ and φ from the optical units 10a and 10b to the X-axis, the values of the X-coordinate Px and the Y-coordinate Py of the point P can be calculated according to the principle of triangulation as shown by the following equations (1) and (2), respectively.

$$Px(\theta, \phi) = (\tan\phi) \div (\tan\theta + \tan\phi) \times L \quad (1)$$

$$Py(\theta, \phi) = (\tan\theta \cdot \tan\phi) \div (\tan\theta + \tan\phi) \times L \quad (2)$$

Figure 8:
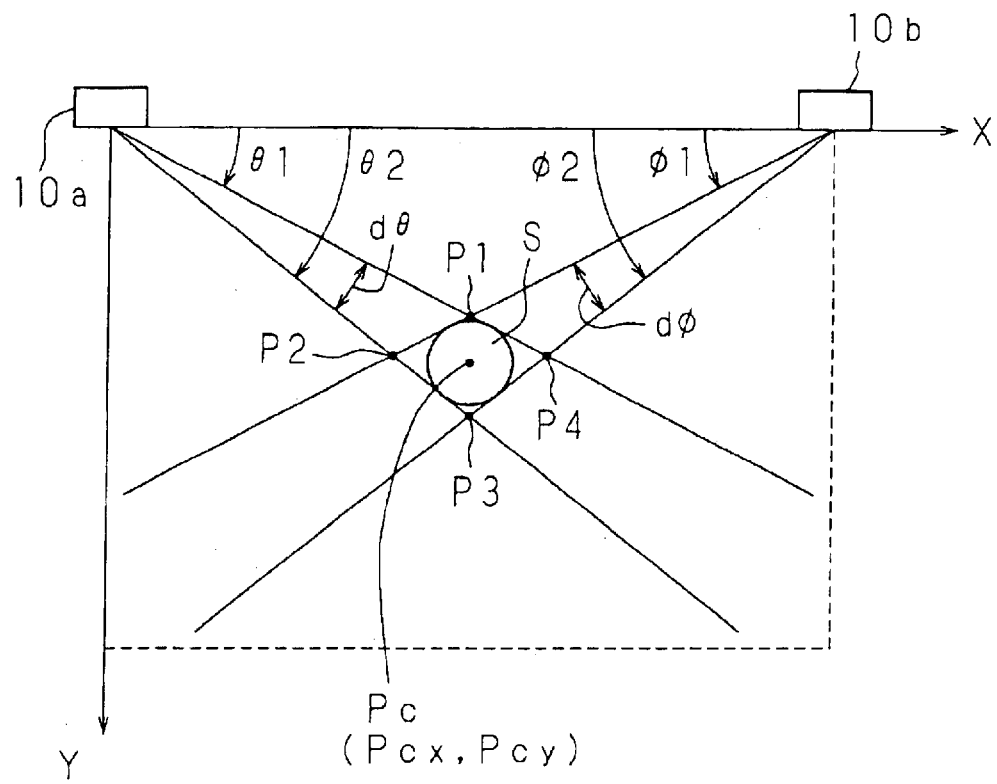
FIG. 8 is a schematic diagram showing the light blocking object and the blocked range.

By the way, since the light blocking object S (finger) has dimensions, when the detection angles in the timings of rise/fall of the detected light receiving signals are used, as shown in FIG. 8, four points (P1 through P4 in FIG. 8) on the edge of the light blocking object S (finger) are detected. These four points are all different from the indicated central point (Pc in FIG. 8). Therefore, the coordinates (Pcx, Pcy) of the central point Pc are calculated as follows. Pcx and Pcy can be expressed as shown by the following equations (3) and (4), respectively.

$$Pcx(\theta, \phi) = Pcx(\theta1 + d\theta/2, \phi1 + d\phi/2) \quad (3)$$

$$Pcy(\theta, \phi) = Pcy(\theta1 + d\theta/2, \phi1 + d\phi/2) \quad (4)$$

Then, by substituting θ1+dθ/2 and φ1+dφ/2 expressed by equations (3) and (4) for θ and φ of equations (1) and (2) above, the coordinates of the indicated central point Pc can be obtained.

Note that, in the above-mentioned example, the average values of the angles are first calculated and then substituted into the converting equations (1) and (2) of triangulation so as to calculate the coordinates of the central point Pc as the indicated position. However, it is also possible to calculate the coordinates of the central point Pc by first calculating the rectangular coordinates of the four points P1 through P4 from the scanning angles according to the converting equations (1) and (2) of triangulation and then calculating the average of the calculated coordinate values of the four points. Further, it is also possible to determine the coordinates of the central point Pc, that is, the indicated position by considering parallax and easiness to see the indicated position.

Figure 9:
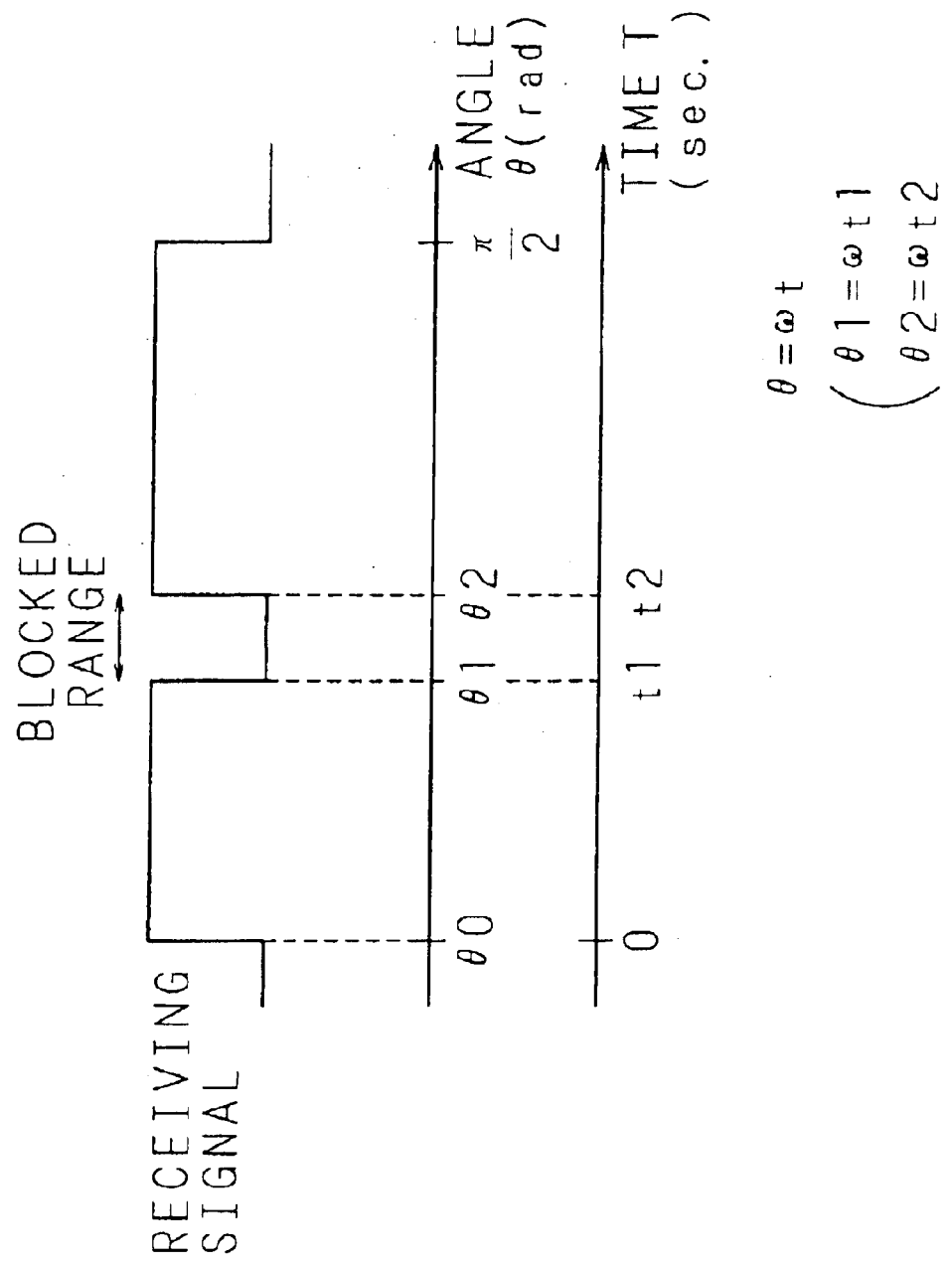
FIG. 9 is a timing chart showing the relation among the light receiving signal, the scanning angle and the scanning time.

By the way, when the scanning angular velocity of each polygon mirror 15 is constant, the information about the scanning angle can be obtained by measuring a time. FIG. 9 is a timing chart showing the relation between the light receiving signal from the light receiving signal detector 33a and the scanning angle θ and scanning time T of the polygon mirror 15 in the optical unit 10a. When the scanning angular velocity of the polygon mirror 15 is constant, if the scanning angular velocity is denoted as ω, then a proportional relation as shown by equation (5) below is established between the scanning angle θ and the scanning time T.

$$\theta = \omega \times T \quad (5)$$

Therefore, the angles θ1 and θ2 at the time of fall and rise of the light receiving signal establish the relations shown by equations (6) and (7) below with the scanning time t1 and t2.

$$\theta1 = \omega \times t1 \quad (6)$$

$$\theta2 = \omega \times t2 \quad (7)$$

Thus, when the scanning angular velocity of the polygon mirrors 15 is constant, it is possible to measure the blocked range and coordinate position of the light blocking object S (finger) by using the time information.

Figure 10:
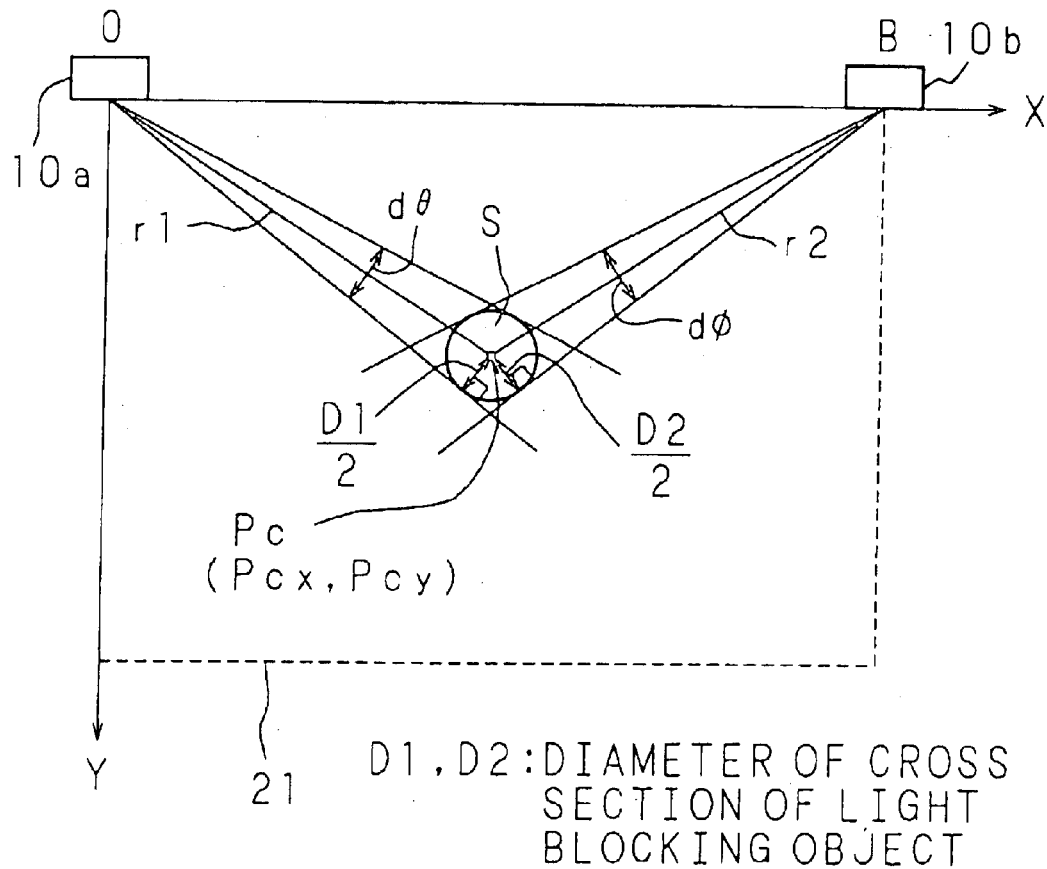
FIG. 10 is a schematic diagram showing the principle of measuring the diameter of a cross section of the light blocking object.

In addition, it is also possible to calculate the size (the diameter of a cross section) of the light blocking object S (finger) from the measured blocked range. FIG. 10 is a schematic diagram showing the principle of measuring the diameter of a cross section of the light blocking object S. In FIG. 10, D1 and D2 represent diameters of the cross sections of the light blocking object S seen from the optical units 10a and 10b, respectively. First, distances OPc (r1) and BPc (r2) from the positions O (0, 0) and B (L, 0) of the optical units 10a and 10b to the central point Pc (Pcx, Pcy) of the light blocking object S are calculated as shown by equations (8) and (9) below.

$$OPc = r1 = (Pcx^2 + Pcy^2)^{1/2} \quad (8)$$

$$BPc = r2 = \{(L-Pcx)^2 + Pcy^2\}^{1/2} \quad (9)$$

Since the radius of the cross section of the light blocking object S can be approximated by the product of the distance to the central point and the sine of a half of the blocking angle, the diameters D1 and D2 of the cross sections are measurable according to equations (10) and (11) below.

$$D1 = 2 \cdot r1 \cdot \sin(d\theta/2) = 2(Pcx^2 + Pcy^2)^{1/2} \cdot \sin(d\theta/2) \quad (10)$$

$$D2 = 2 \cdot r2 \cdot \sin(d\phi/2) = 2\{(L-Pcx)^2 + Pcy^2\}^{1/2} \cdot \sin(d\phi/2) \quad (11)$$

Note that, when dθ/2, dφ/2≈0, it is possible to approximate sin(dθ/2)≅dθ/2≅tan(dθ/2) and sin(dφ/2)≅dφ/2≅tan(dφ/2), and therefore dθ/2 or tan(dθ/2), or dφ/2 or tan(dφ/2) maybe substituted for sin(dθ/2) and sin(dφ/2) in equations (10) and (11).

By the way, as shown in FIG. 4, the laser light from the optical units 10a and 10b can scan not only the region within the display screen 21, but also the region outside thereof, i.e., the region between the display screen 21 and the light retro-reflector 4, and the reflected light from the light retro-reflector 4 can be received by the optical units 10a and 10b. Hence, even when a light blocking object is present in such a region, it is possible to calculate the position in exactly the same manner as the position within the display screen 21. Moreover, by inputting/setting the size information and positional information about the display screen 21 in advance, it is possible to readily judge as to whether the light blocking object is present within the display screen 21 or outside the display screen 21. The following description will explain an example utilizing the detection of the light blocking object in the region outside the display screen 21 and the calculation of the position (the detection of dust and the use of virtual buttons).

Figure 11:
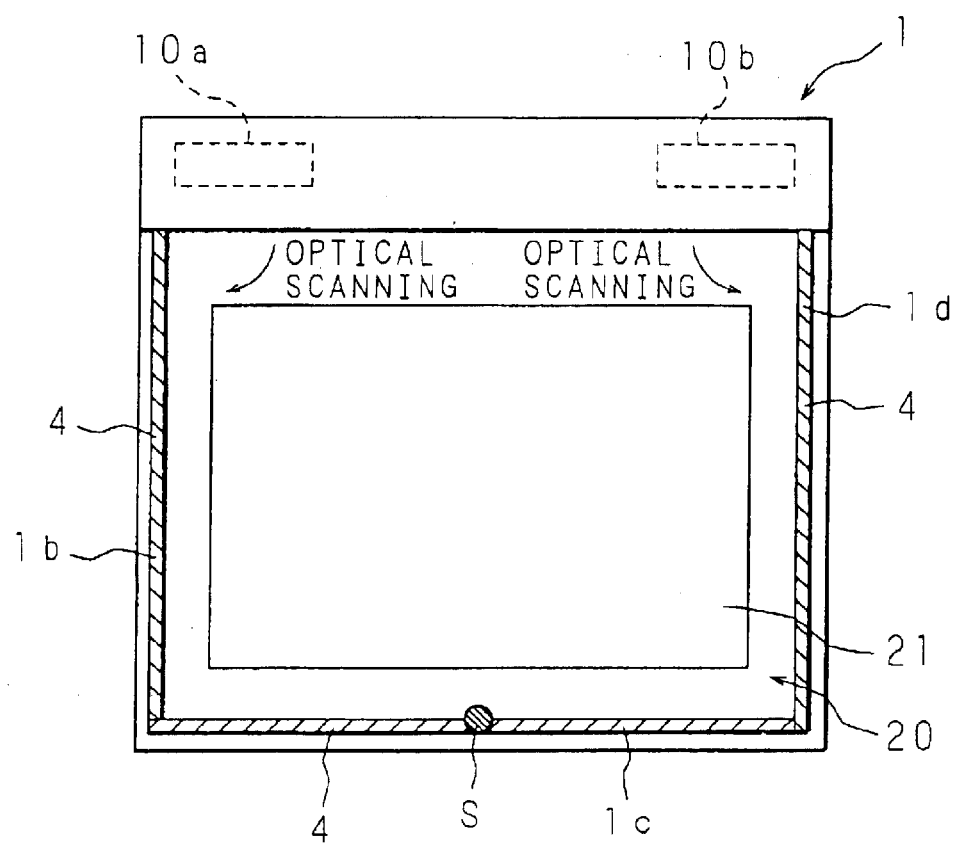
FIG. 11 is a view showing a state in which a light blocking object (dust) is present on the lower-side light retro-reflector.
Figure 13:
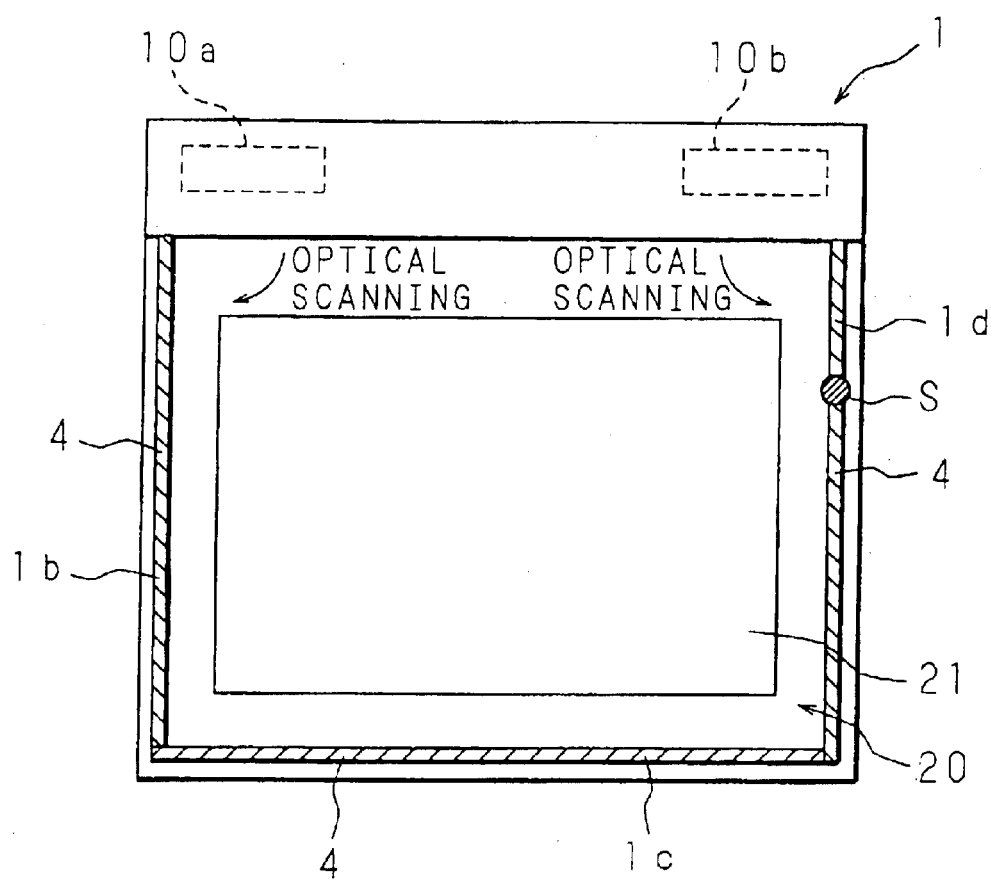
FIG. 13 is a view showing a state in which a light blocking object (dust) is present on the right-side light retro-reflector.

First, the detection of a light blocking object present on or around the light retro-reflector 4 will be explained. FIG. 11 is a view showing a state in which the light blocking object S is present on the light retro-reflector 4 on the lower-side frame 1c. FIGS. 12(a) and 12(b) show, respectively, the light receiving signals of the optical units 10a and 10b in such a state. Further, FIG. 13 is a view showing a state in which the light blocking object S is present on the light retro-reflector 4 on the right-side frame 1d. FIGS. 14(a) and 14(b) show, respectively, the light receiving signals of the optical units 10a and 10b in such a state. Note that the broken lines in FIG. 12 and FIG. 14 indicate a threshold level for detecting the light blocking object, and, when the light receiving signal level becomes lower than this threshold level within the scanning range, the presence of the light blocking object is detected.

When there is a light blocking object S on the light retro-reflector 4 on the lower-side frame 1c, the light blocking object S is detected by both of the optical units 10a and 10b, while, when there is a light blocking object S on the light retro-reflector 4 on the right-side frame 1d, the light blocking object S is detected only by the optical unit 10a because the laser light from the optical unit 10b is not scanned to the region. Note that, when there is a light blocking object S on the light retro-reflector 4 on the left-side frame 1b, the light blocking object S is detected only by the optical unit 10b.

Thus, by inputting/setting the positional information about the optical units 10a, 10b and the light retro-reflectors 4 in advance, it is possible to detect which side-frame light retro-reflector 4 has the light blocking object thereon or nearby, based on the calculated position of the light blocking object.

Figure 15:
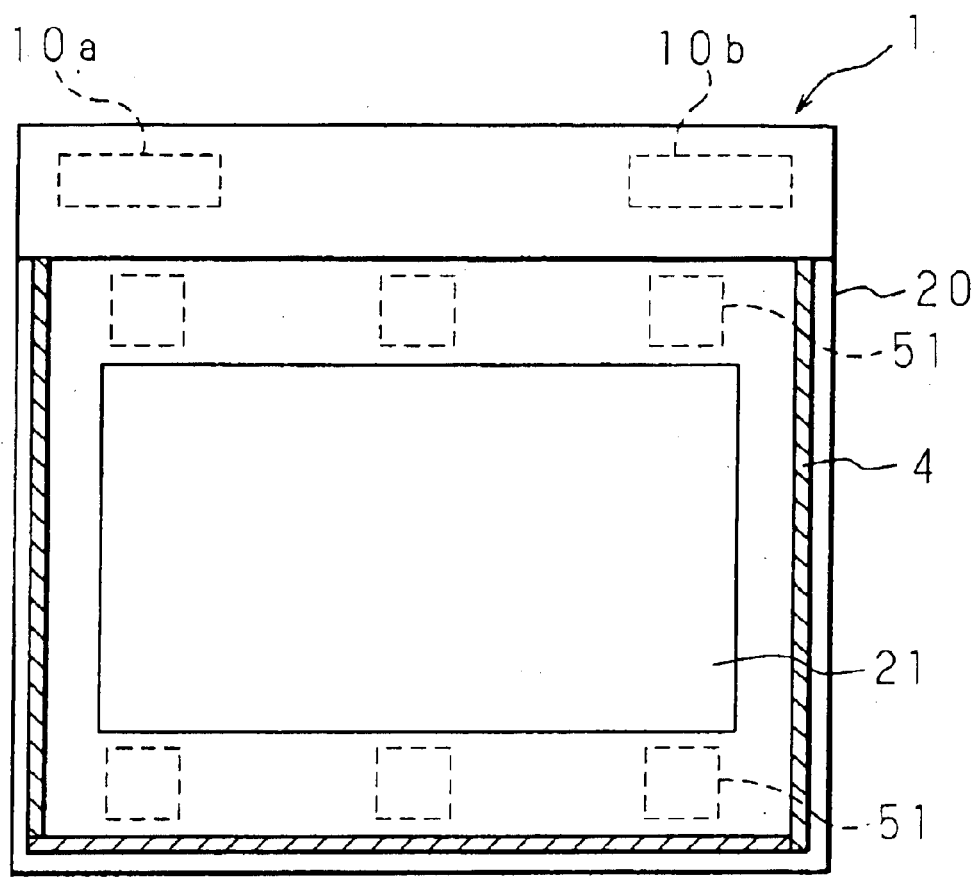
FIG. 15 is a view showing an example of providing virtual buttons.

Next, an example of using the virtual buttons will be explained. FIG. 15 is a view showing an example of the arrangement of the virtual buttons. Virtual buttons 51 for accepting specific functions from outside are provided in a region located outside the display screen 21 and capable of detecting the position of the light blocking object. Hence, the virtual buttons 51 enable the effective use of the outside of the display screen 21, and can also be used as hidden command input means. The user can input a desired command by pressing the virtual button 51.

Figure 16:
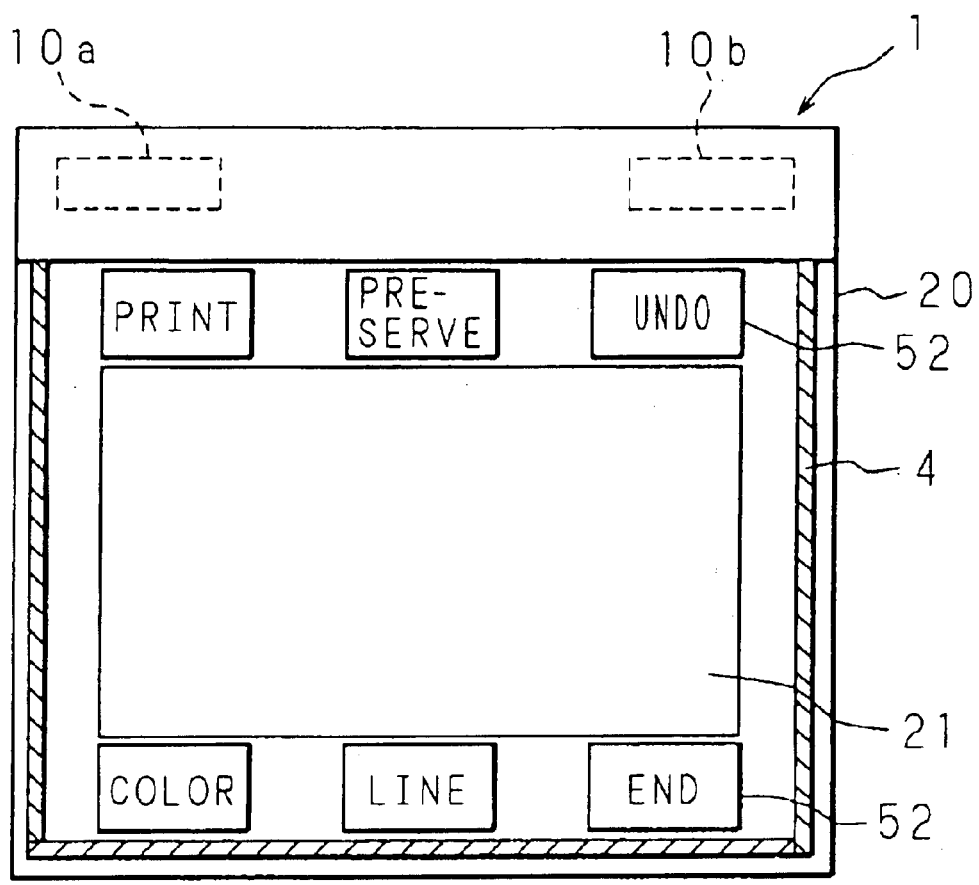
FIG. 16 is a view showing a state in which a template of virtual buttons is attached to the display apparatus.

FIG. 16 is a view showing a state in which a template 52 of the virtual buttons 51 is attached to the display apparatus 20 so as to improve the user interface. A thin template 52 is preferred so as not to interfere with the scanning light. The display apparatus 20 may be provided with a recessed section in advance so as to fit the template 52 in the recessed section.

Note that, in FIGS. 15 and 16, although the virtual buttons 51 are provided on the upper and lower outside of the display screen 21, needless to say, it is also possible to provide the virtual buttons 51 on the left and right outside thereof.

Figure 17:
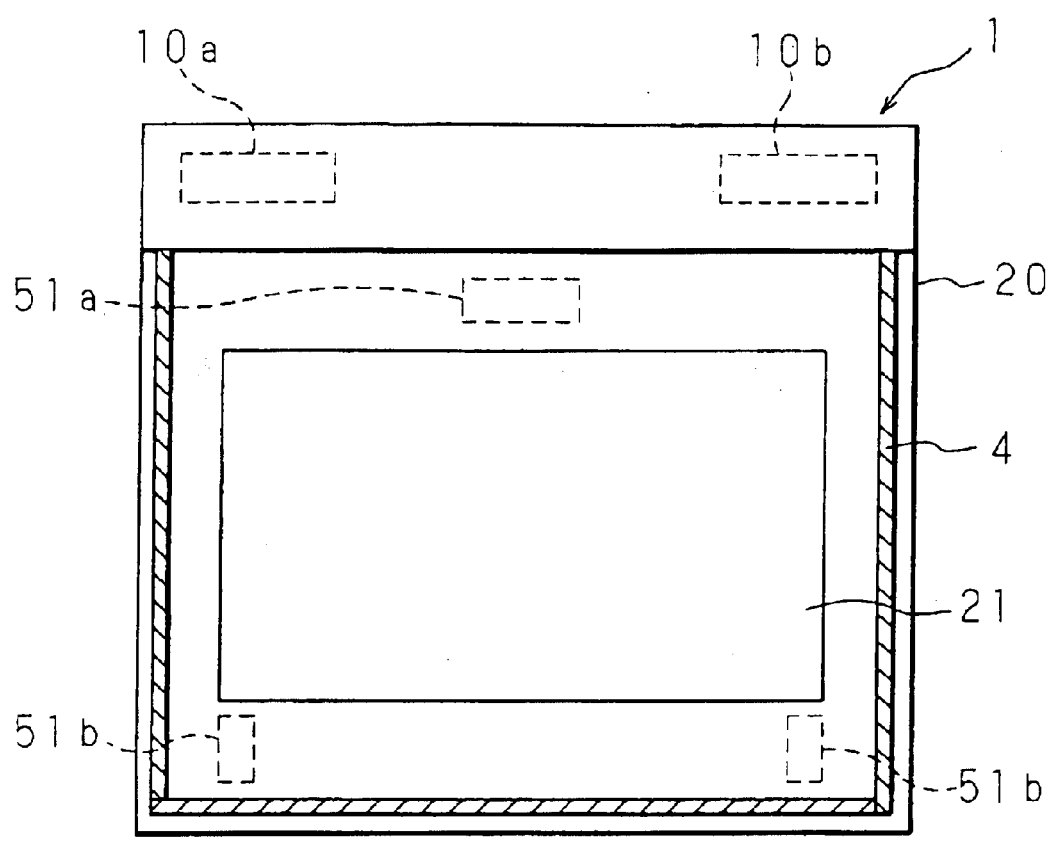
FIG. 17 is a view showing examples of the shapes of the virtual buttons.

FIG. 17 is a view showing examples of the shapes of such virtual buttons 51. Since the position of the light blocking object is calculated using the triangulation principle, if a virtual button (virtual button 51a in FIG. 17) is provided in between the two optical units 10a and 10b or the vicinity thereof, the position calculation accuracy in the horizontal direction is lowered. Therefore, the shape of the virtual button 51a is made longer in the horizontal direction so as to enable stable detection of the pressing of the button. Besides, for the same reason, in the case where virtual buttons (virtual buttons 51b in FIG. 17) are provided on the side opposite to the optical units 10a and 10b with the display screen 21 therebetween, at positions in the vicinity of both ends of the display apparatus 20, the position detection accuracy in the vertical direction is lowered. Therefore, the shape of the virtual button 51b is made longer in the vertical direction so as to enable stable detection of the pressing of the button.

Figure 18:
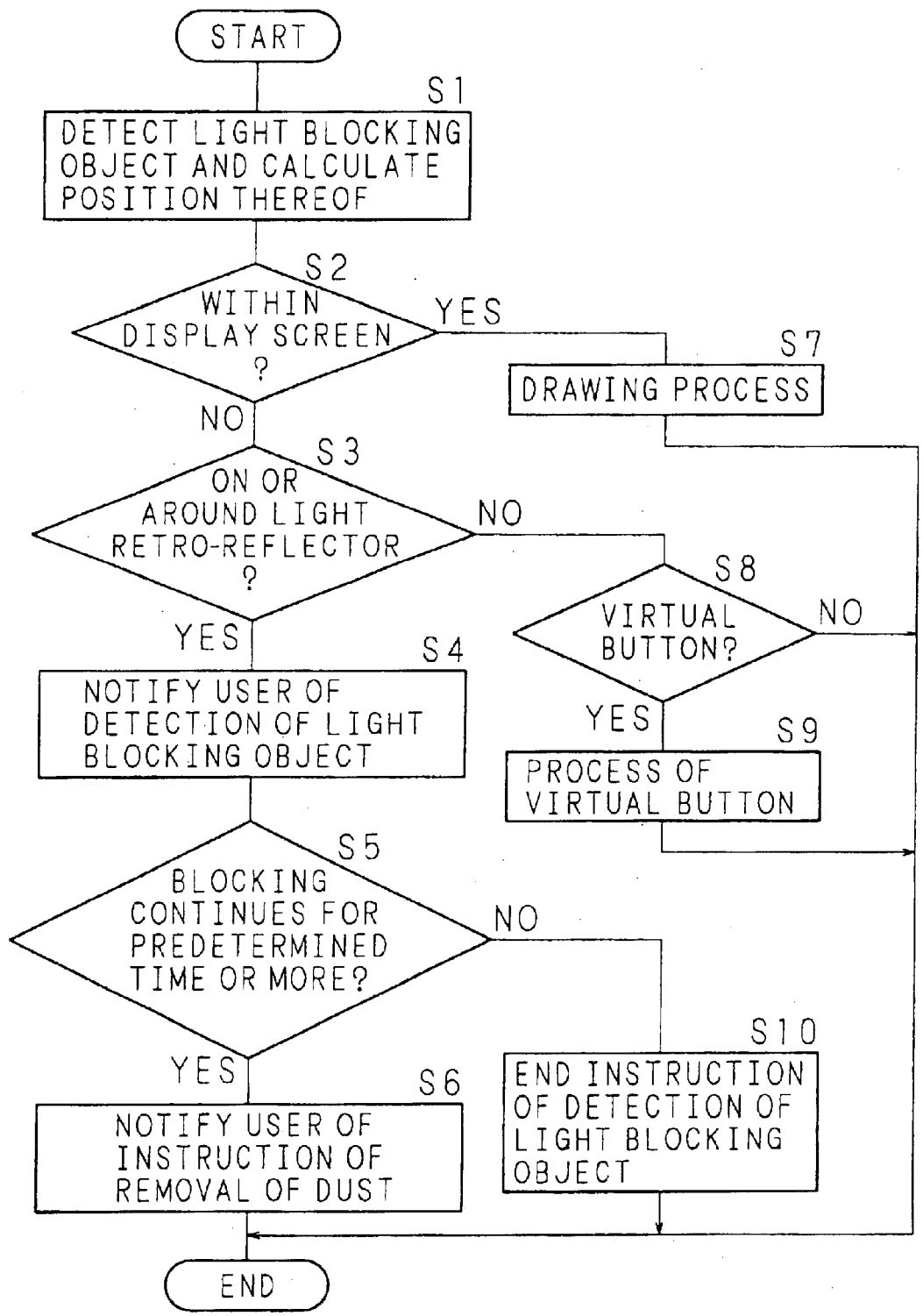
FIG. 18 is a flow chart showing the procedure of the process in the optical position detecting device.

FIG. 18 is a flow chart showing the procedure of the process in the optical position detecting device of the present invention. First, the CPU 41 detects a light blocking object and calculates the position thereof (step S1). The CPU 41 judges whether the calculated position of the light blocking object is within the display screen 21 (step S2). If it is within the display screen 21 (S2: YES), the CPU 41 performs a drawing process based on an indicated input given by input means (for example, a finger) (step S7).

Next, the CPU 41 judges whether the calculated position of the light blocking object is on or around the light retro-reflector 4 (step S3). If not (S3: NO), the CPU 41 judges whether the calculated position coincides with the position of a virtual button 51 (step S8). If it coincides with the position of a virtual button 51 (S8: YES), the CPU 41 judges that the virtual button 61 is indicated by the input means (for example, a finger) and executes the process of the virtual button 51 (step S9). If the calculated position does not coincide with the position of a virtual button 51 (S8: NO), since it is considered that the user made a touch by mistake, the CPU 41 just ends the process.

Figure 19:
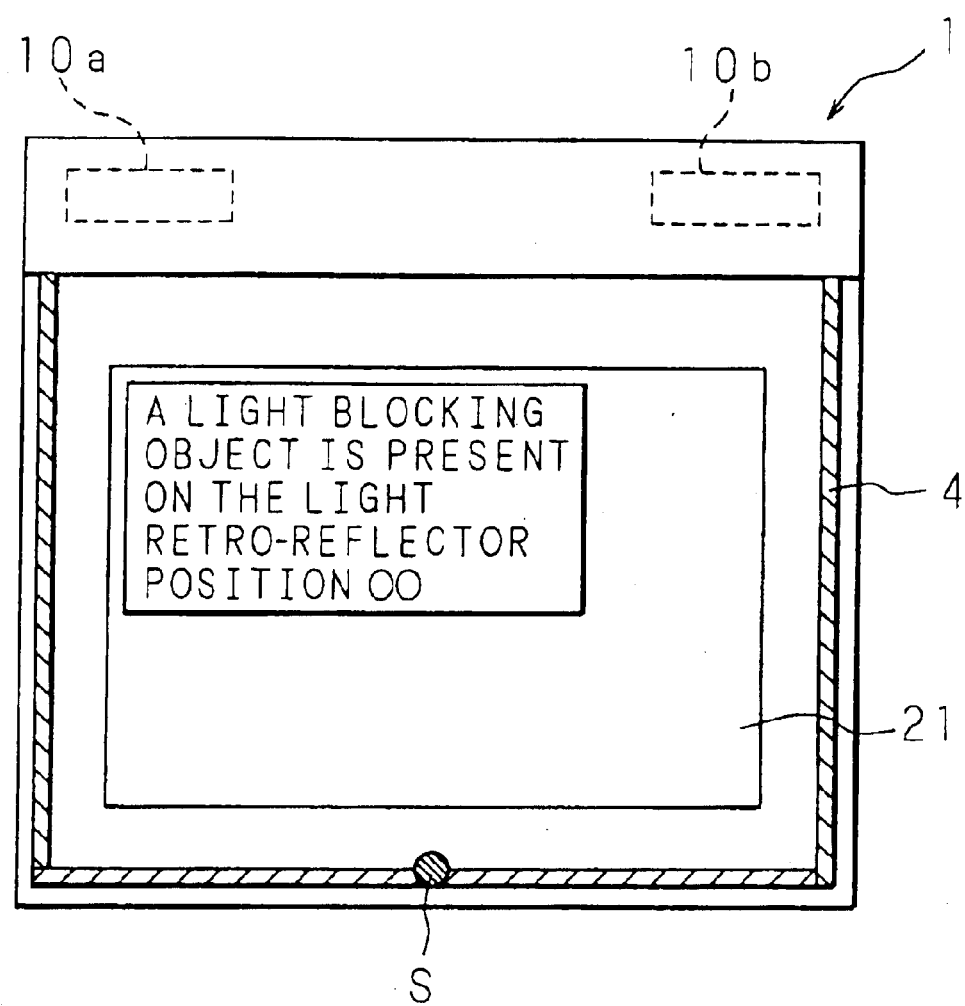
FIG. 19 is a view showing an example of notifying the user of the presence of a light blocking object on the light retro-reflector.
Figure 20:
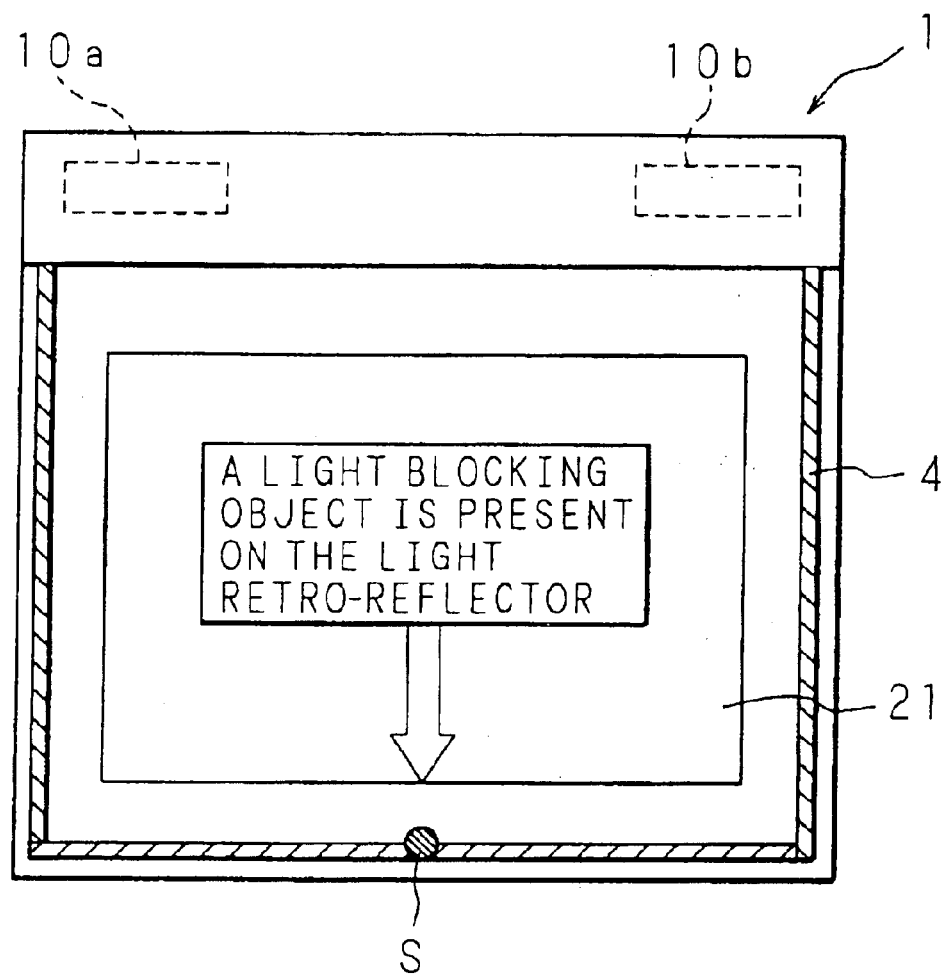
FIG. 20 is a view showing another example of notifying the user of the presence of a light blocking object on the light retro-reflector.

If the calculated position of the light blocking object is on or around the light retro-reflector 4 (S3: YES), the CPU 41 notifies the user of this fact (step S4). FIG. 19 is a view showing an example of notification, notifying the user of this fact by displaying the positional information together with a message "A light blocking object is present on the light retro-reflector" on the display screen 21. FIG. 20 is a view showing another example of notification, displaying a message notifying the presence of the light blocking object and the position of the light blocking object with an arrow. Accordingly, it is possible to attract the user's attention to the presence of an object other than the input means (for example, a finger) on or around the light retro-reflector 4.

Figure 21:
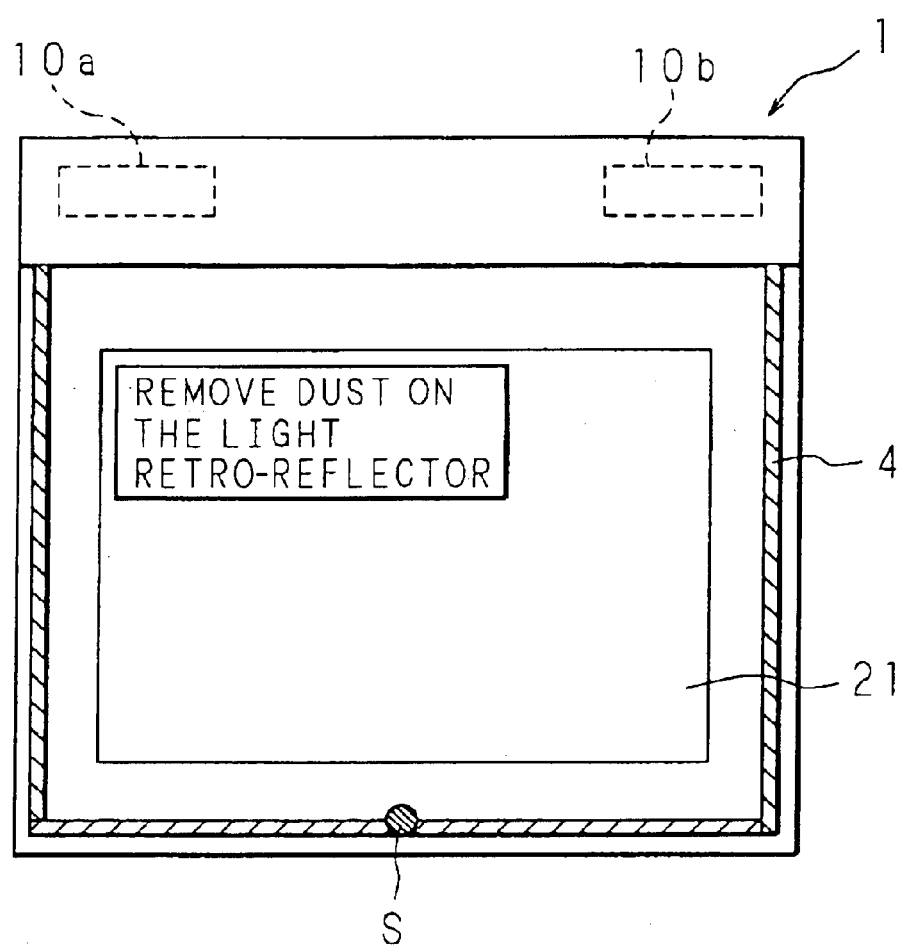
FIG. 21 is a view showing an example of instructing the user to remove dust.
Figure 22:
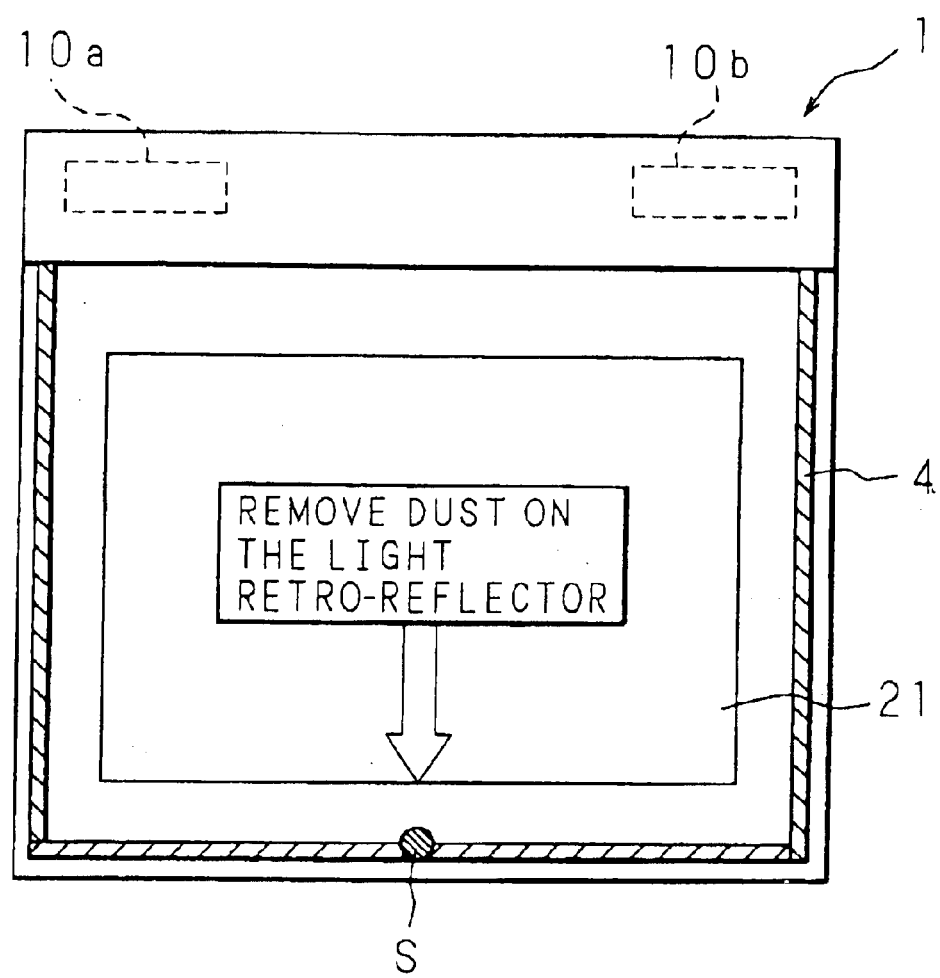
FIG. 22 is a view showing another example of instructing the user to remove dust.

Next, the CPU 41 judges whether the light blocking object has been present on or around the light retro-reflector 4 for a predetermined time or more (for example, one minute or more) (step S5). If it has been present for the predetermined time or more (S5: YES), the CPU 41 judges that the light blocking object is dust and instructs the removal of the dust (step S6). FIG. 21 is a view showing an example of instruction, notifying the user of the presence of the dust by displaying on the display screen 21 a message "Remove dust on the light retro-reflector" together with the positional information. FIG. 22 is a view showing another example of instruction, indicating the position of dust with an arrow as well as displaying the dust removal message. Accordingly, the presence of dust is notified to the user, and the dust is promptly removed, thereby preventing an operational defect caused by dust.

Note that, if the light blocking object disappeared within the predetermined time (S5: NO), since it is considered that the user made a touch by mistake, the CPU 41 ends the displaying of the message indicating the presence of the light blocking object (step S10).

Besides, in the above-described example, although dust on or around the light retro-reflector 4 and the pressing of the virtual button 51 are distinguished based on the calculated position, it is also possible to distinguish them based on the light blocking time. More specifically, when the light blocking time is equal to or more than a predetermined time, the CPU 41 judges that dust is present on or around the light retro-reflector 4, while, when the light blocking time is shorter than the predetermined time, the CPU 41 judges that the virtual button 51 is pressed.

Figure 23:
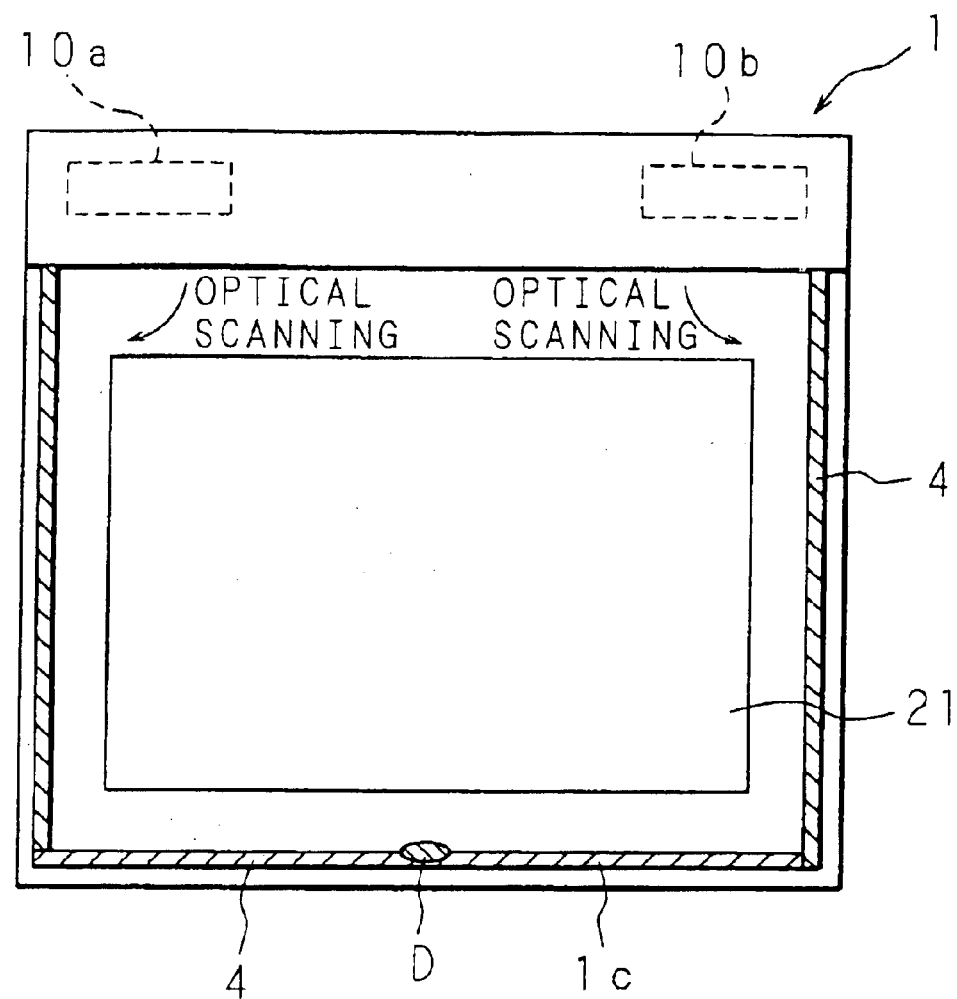
FIG. 23 is a view showing a state in which the light retro-reflector has dirt.

Next, the following description will explain an embodiment for detecting dirt on the light retro-reflector 4. FIG. 23 is a view showing a state in which the light retro-reflector 4 on the lower side frame 1c has dirt D. FIGS. 24(a) and 24(b) are views showing the light receiving signals of the optical units 10a and 10b in such a state. Note that the broken lines in FIG. 24 indicate a threshold level for detecting a light blocking object similar to that of FIG. 12 and FIG. 14, while the dotted lines in FIG. 24 indicate a dirt detection level necessary for detecting the dirt on the light retro-reflector 4. The dirt detection level is higher than the threshold level.

Figure 25:
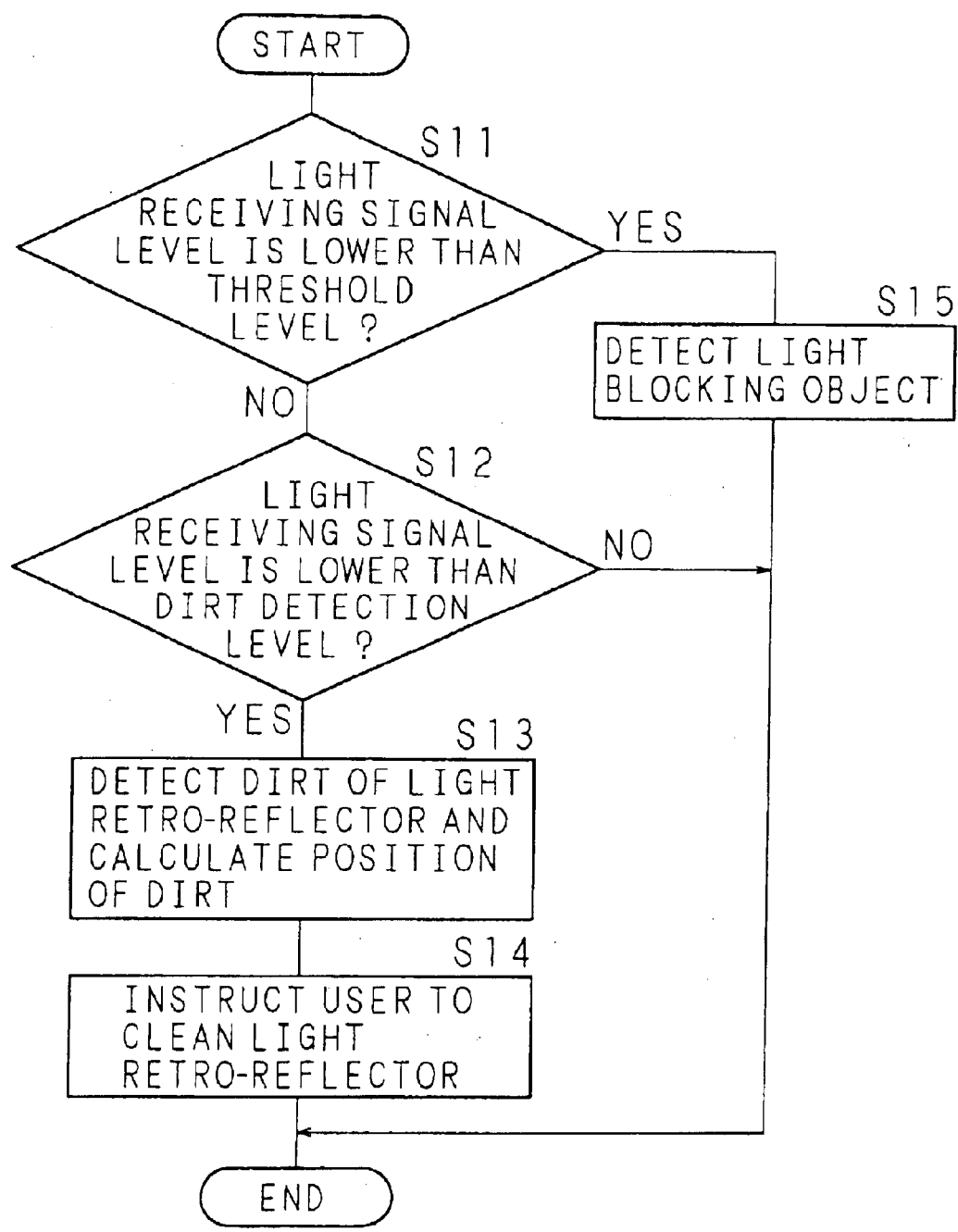
FIG. 25 is a flow chart showing the procedure of the process of detecting dirt on the light retro-reflector.

FIG. 25 is a flow chart showing the procedure of the process of detecting dirt on the light retro-reflector 4. The CPU 41 judges whether the light receiving signal level became lower than the threshold level within the scanning range (step S11). If it became lower than the threshold level (S11: YES), the CPU 41 judges that a light blocking object is present (step S15). If it did not become lower the threshold level (S11: NO), the CPU 41 judges whether the light receiving signal level became lower than the dirt detection level within the scanning range (step S12).

Figure 26:
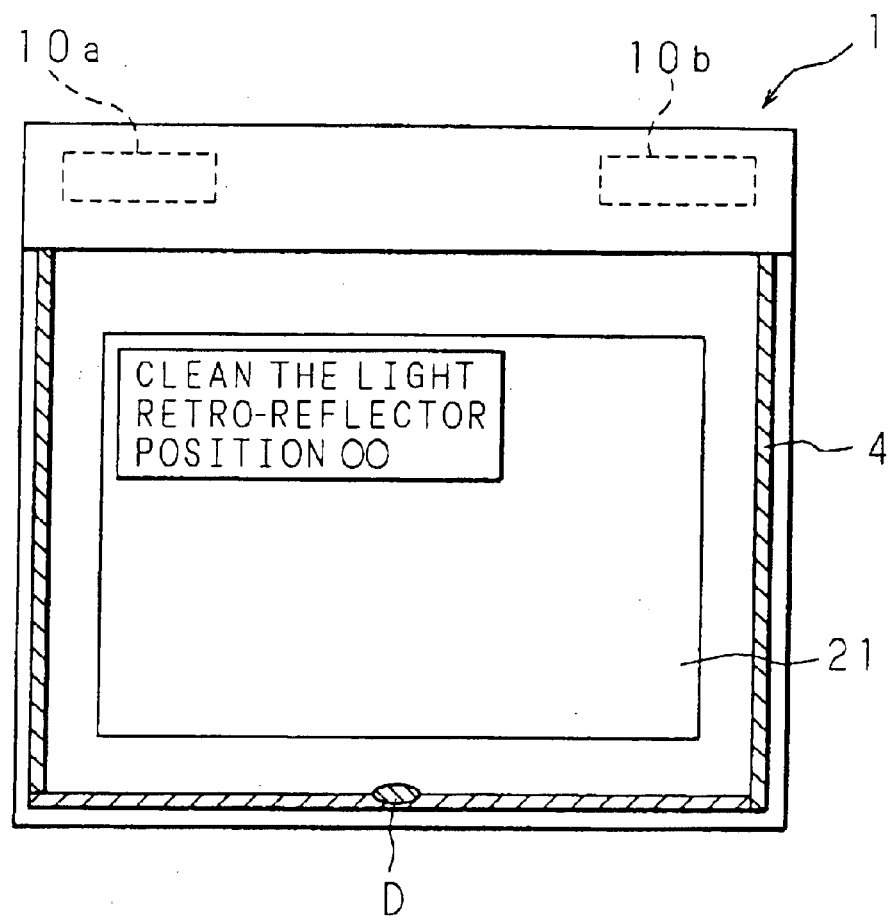
FIG. 26 is a view showing an example of instructing the user to clean the light retro-reflector.

If the light receiving signal level became lower than the dirt detection level within the scanning range (S12: YES), the CPU 41 detects that the light retro-reflector 4 has dirt and calculates the position of the dirt (step S13). Then, the CPU 41 instructs the user to clean the light retro-reflector 4 (step S14). FIG. 26 is a view showing an example of instruction, notifying the user of the presence of dust by displaying on the display screen 21 a message "Clean the light retro-reflector" together with the positional information. Accordingly, the user is notified of the fact that there is dirt on the light retro-reflector 4, and then the light retro-reflector 4 is promptly cleaned, thereby preventing an operational defect due to the dirt.

Note that, after the process of S15 in FIG. 25, by connecting the processes of S1 through S10 shown in FIG. 18 together, it is possible to sequentially execute the proper drawing process, the process of detecting dirt on the light retro-reflector 4, the process of detecting the pressing of the virtual button and the process of detecting dust on or around the light retro-reflector 4.

Figure 27:
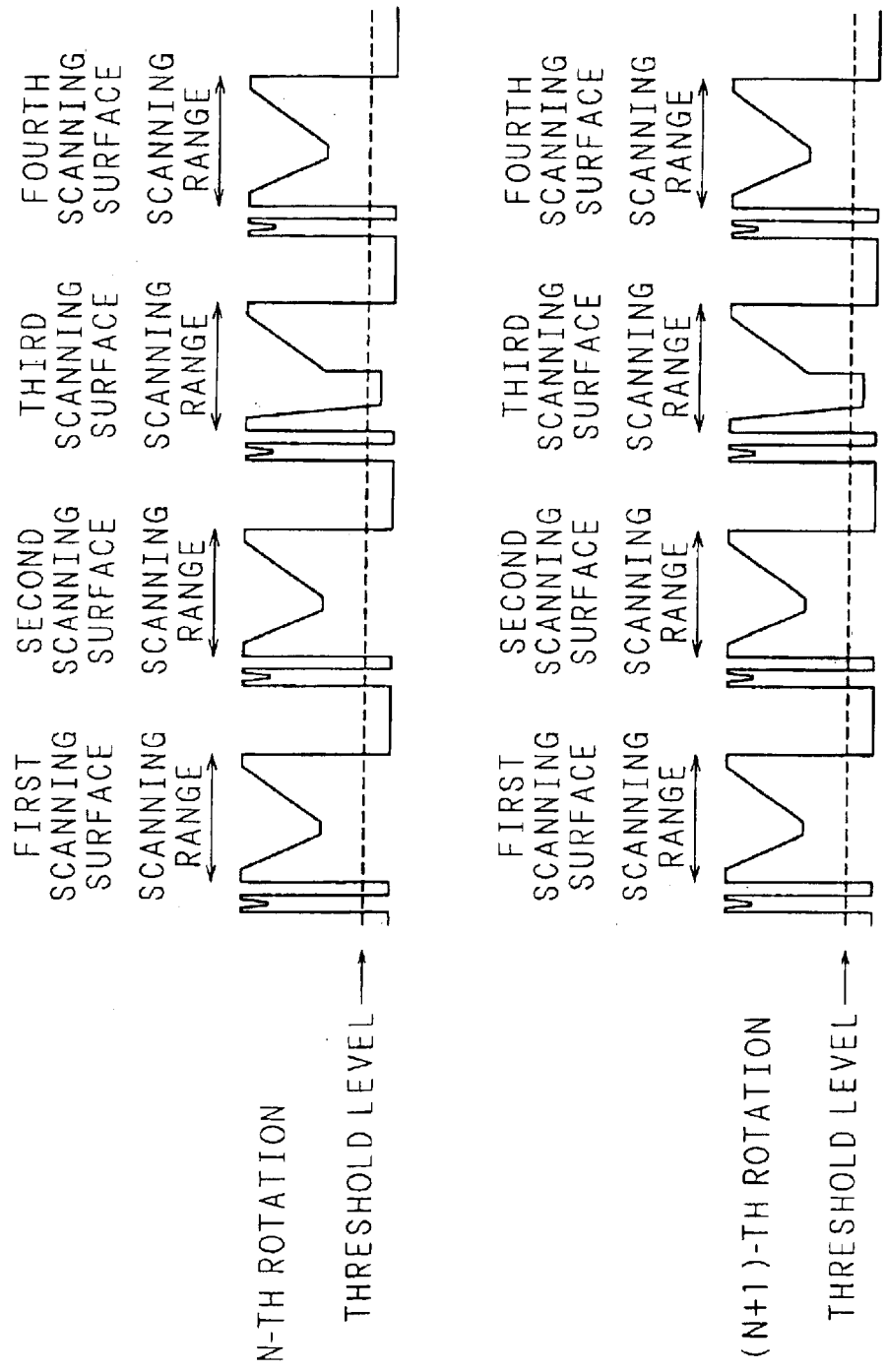
FIG. 27 is a view showing an example of the light receiving signals of the optical units in association with four scanning surfaces of the polygon mirror.

Next, the following description will explain an embodiment for detecting a deviation of scanning light of the polygon mirror 15. FIG. 27 is a view showing an example of the light receiving signals of the optical units 10a and 10b in association with the four scanning surfaces of the polygon mirror 15. The light receiving signal levels become lower than the threshold level periodically, and, in FIG. 27, the only light receiving signal level corresponding to the third scanning surface of the polygon mirror 15 is lower than the threshold level.

Since the surface inclination angles of the polygon mirror 15 are not equal, if the scanning light gets out of the light retro-reflector 4, no reflected light is obtained and a pattern as shown in FIG. 27 is exhibited. Accordingly, when a change in the light receiving signals in which the signal level became lower than the threshold level periodically was detected, it is possible to judge that there is an operational defect of the polygon mirror 15.

In the case where such an operational defect of the polygon mirror 15 was detected, the calculation data can be stabilized by performing the smoothing process of calculating the movement average and removing the maximum and minimum values by using software for calculating the position of the light blocking object.

Figure 28:
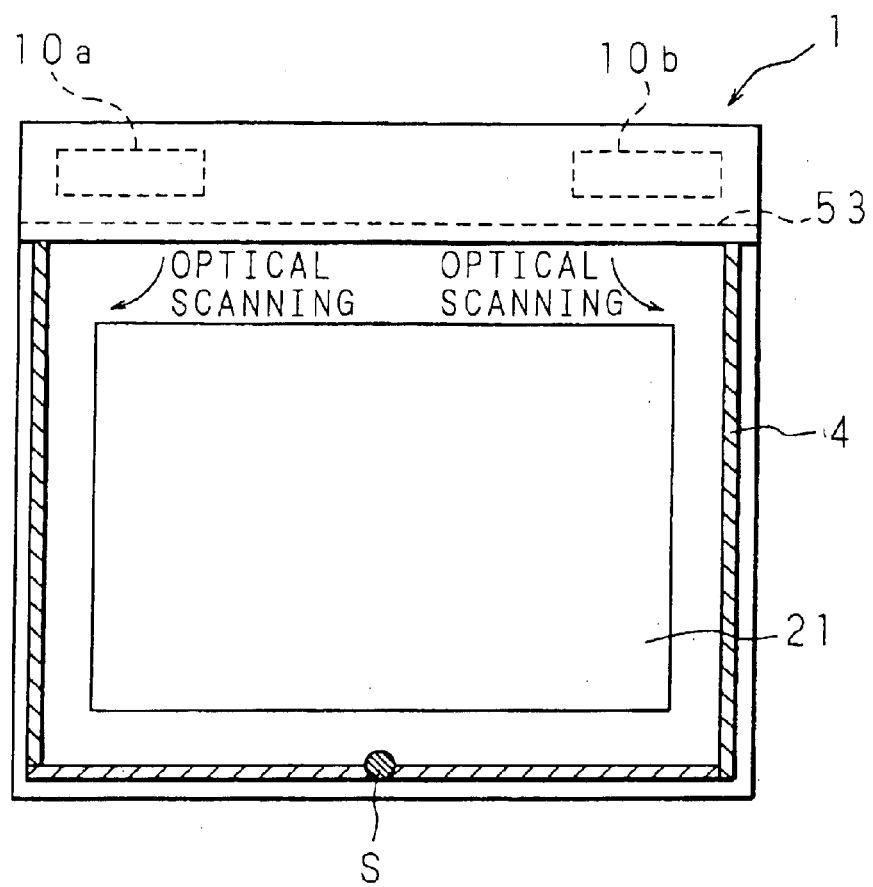
FIG. 28 is a view showing a state in which the optical units are provided with a cover.

Next, the following description will explain an embodiment for detecting dirt on the surface of a cover provided for the optical units 10a and 10b. FIG. 28 is a view showing a state in which the optical units 10a and 10b are provided with a cover 53 to prevent dust or the like from entering into the optical units 10a and 10b from outside.

FIG. 29 shows examples of the light receiving signals of the optical units 10a and 10b in such a state. FIG. 29(a) shows the light receiving signal when the surface of the cover 53 is not dirty, while FIG. 29(b) shows the light receiving signal when the surface of the cover 53 is dirty. Note that the broken lines in FIG. 29 indicate a threshold level for detecting a light blocking object, while the dotted lines show a reference potential necessary for detecting dirt on the surface of the cover 53.

When the surface of the cover 53 is not dirty, the base potential is not high. On the other hand, when it is dirty, the base potential of the light receiving signal is increased due to irregular reflection from the dirt. Accordingly, by detecting such an increase in the base potential, it is possible to detect the dirt on the surface of the cover 53.

Figure 30:
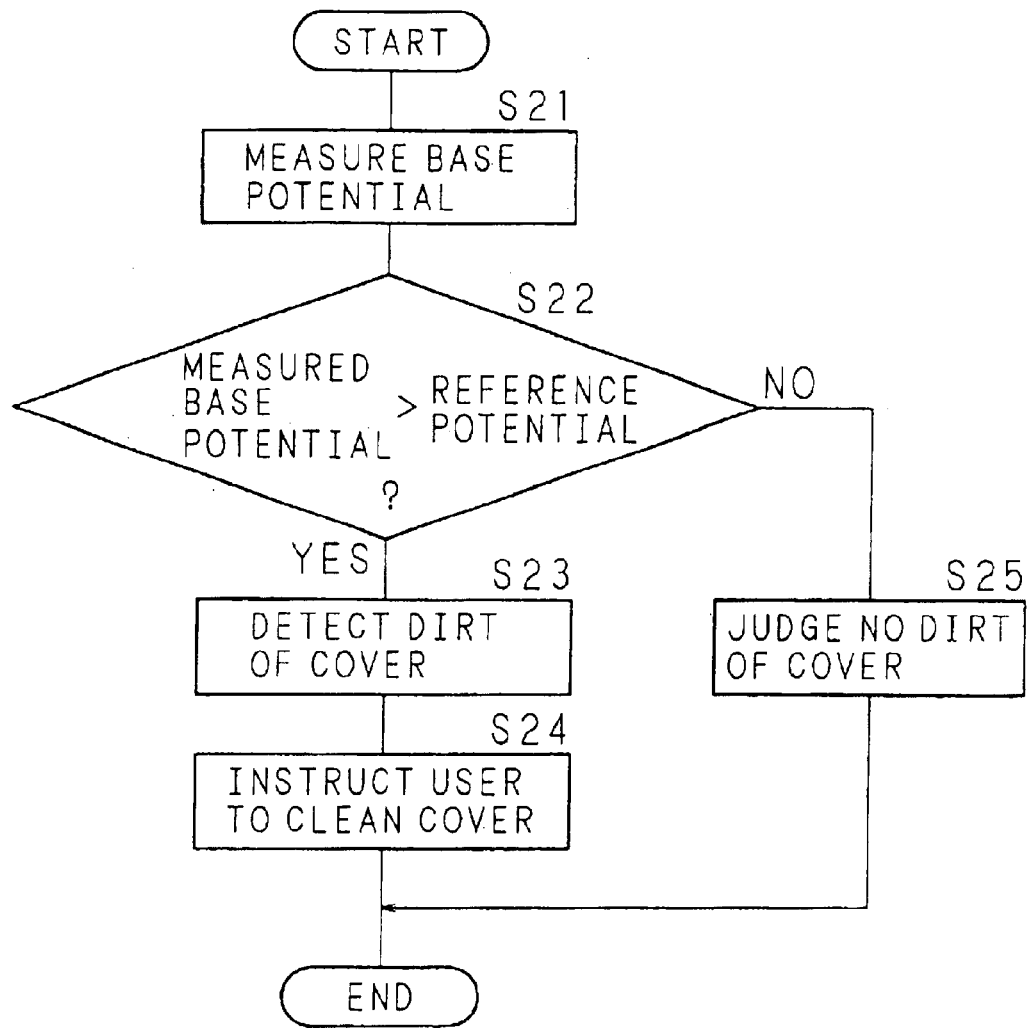
FIG. 30 is a flow chart showing the procedure of the process of detecting dirt on the surface of the cover.
Figure 31:
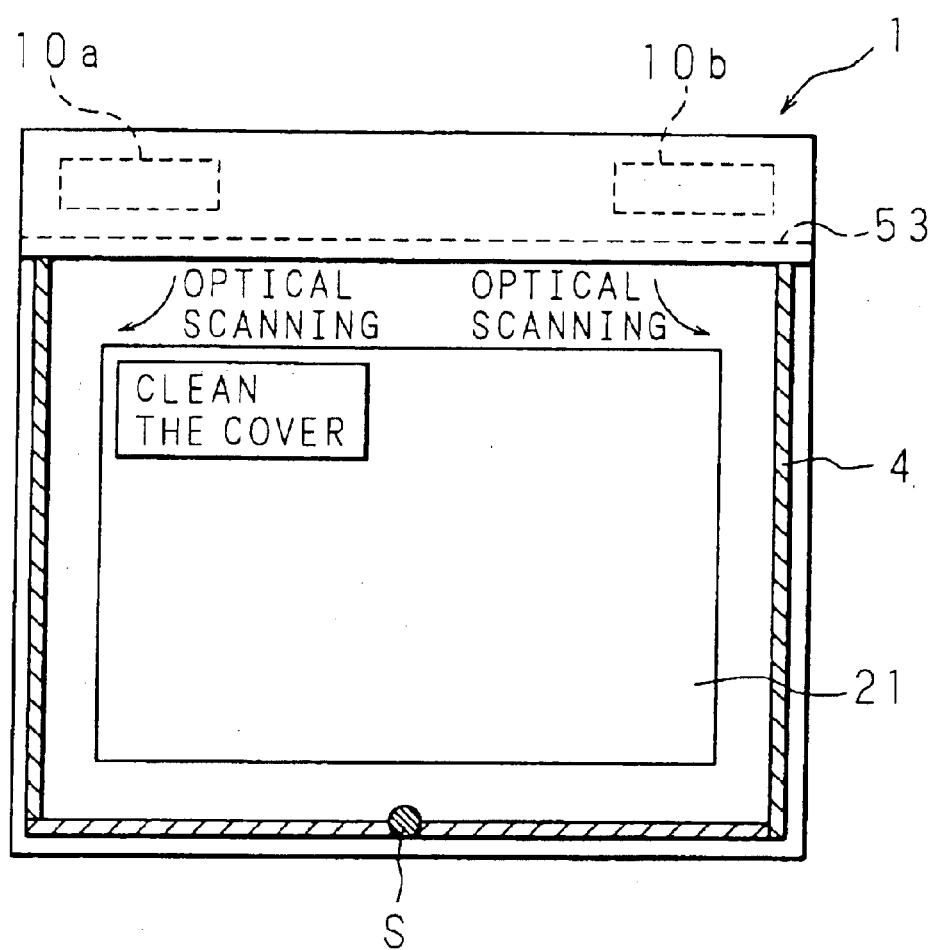
FIG. 31 is a view showing an example of instructing the user to clean the cover.

FIG. 30 is a flow chart showing the procedure of the process of detecting dirt on the surface of the cover 53. The CPU 41 measures the base potential of the obtained light receiving signal (step S21), and judges whether the measured value is higher than the reference potential (step S22). If it is higher (S22: YES), the CPU 41 detects the presence of dirt on the surface of the cover 53 (step S23), and instructs the user to clean the cover 53 (step S24). FIG. 31 is a view showing an example of instruction, notifying the user of the presence of dirt by displaying a message "Clean the cover" on the display screen 21. Accordingly, the presence of dirt on the surface of the cover 53 is notified to the user, and the cover 53 is promptly cleaned, thereby preventing an operational defect caused by the dirt. On the other hand, if the measured base potential is not higher than the reference potential (S22: NO), the CPU 41 judges that the surface of the cover 53 is not dirty (step S25).

Note that it is of course possible to sequentially execute the above-mentioned processes of S21 through S25 shown in FIG. 30 by connecting them with the flow chart shown in FIG. 18 and/or FIG. 25.

Figure 32:
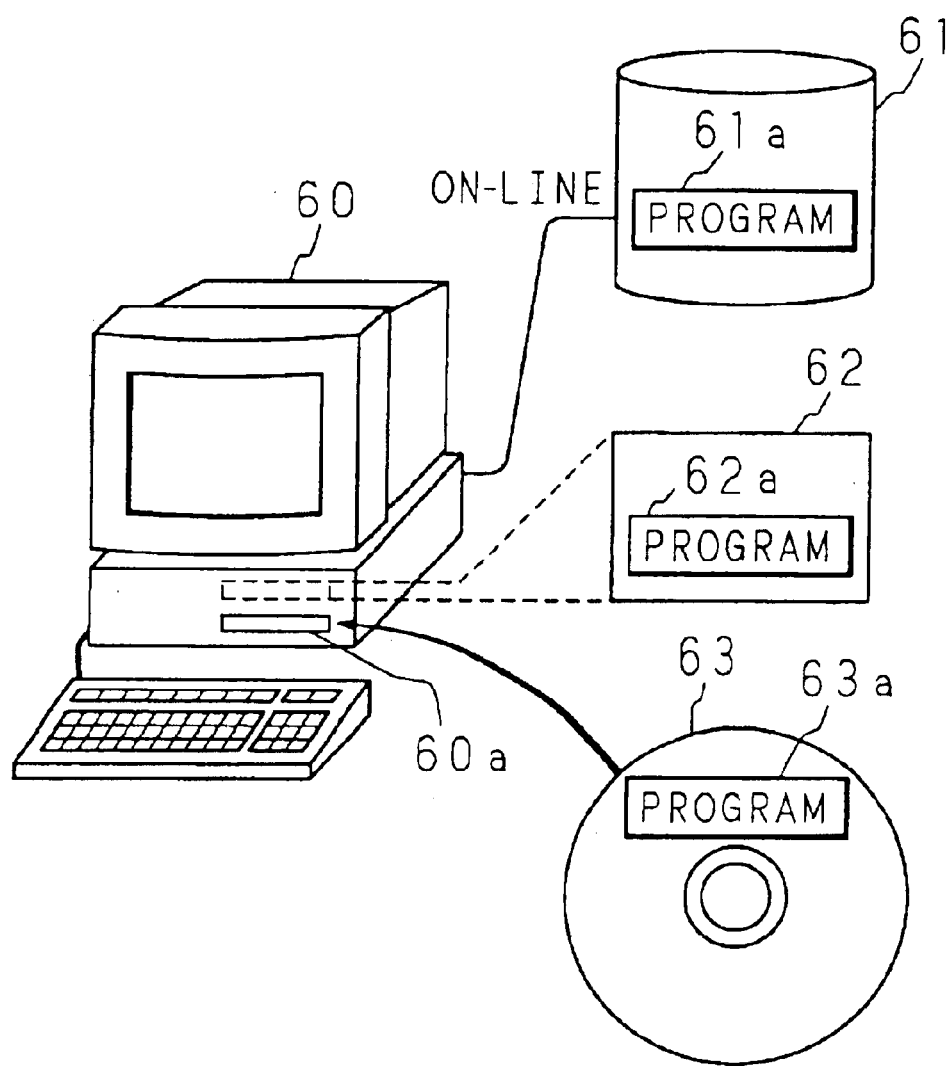
FIG. 32 is a view showing the structure of an embodiment of a recording medium.

FIG. 32 is a view showing the structure of an embodiment of a recording medium of the present invention. A program exemplified here includes a part or all of the above-mentioned processes of calculating the position and size of a light blocking object and the processes in the flow charts shown in FIGS. 18, 25 and 30, and is recorded on recording media explained below.

In FIG. 32, a recording medium 61 to be on-line connected to a computer 60 is implemented using a server computer, for example, WWW (World Wide Web), located in a place distant from the installation location of the computer 60, and a program 61a as mentioned above is recorded on the recording medium 61. The program 61a read from the recording medium 61 controls the computer 60 so that the computer 60 executes the above-described processes.

A recording medium 63 used by being loaded into a disk drive 60a installed in the computer 60 is implemented using, for example, a removable magneto-optical disk, CD-ROM, floppy disk or the like, and a program 63a as mentioned above is recorded on the recording medium 63. The program 63a read from the recording medium 63 controls the computer 60 so that the computer 60 excutes the above-described processes.

A recording medium 63 used by being loaded into a disk drive 60a installed in the computer 60 is implemented using, for example, a removable magneto-optical disk, CD-ROM, flexible disk or the like, and a program 63a as mentioned above is recorded on the recording medium 63. The program 63a read from the recording medium 63 controls the computer 60 so that the computer 60 executes the above-described processes.

Note that while the above examples illustrate the detection carried out by the optical position detecting device externally mounted on the display apparatus, it is of course possible to apply the present invention in a similar manner to a display screen-integrated optical position detecting device.

Industrial Applicability

As described above, since the present invention performs detection of the position of a light blocking object not only within a predetermined region (display screen), but also in a range outside the predetermined region in the same manner as in the predetermined region, the range outside the predetermined region can also be used effectively. Moreover, since the present invention can detect dust on or around the light retro-reflector and/or dirt on the light retro-reflector, it is possible to prevent an operational defect caused by the dust and/or dirt. Furthermore, the present invention can readily detect an operational defect of the optical scanning unit (polygon mirror) and perform the operation of the position detection process in a stable manner. In addition, since the present invention can detect dirt on a cover covering the optical transceivers, it is possible to prevent an operation defect caused by the dirt.

What is claimed is:

1. An optical position detecting device comprising:
   a light retro-reflector provided outside a predetermined region, wherein the predetermined region further comprises a display screen and a non-screen area bordering the display screen;
   at least two optical transceivers, each including an optical scanning unit for angularly scanning light in a plane substantially parallel to the predetermined region and a light receiving unit for receiving reflected light from a portion of said light retro-reflector irradiated with the scanning light;
   a detector for detecting a position of a light blocking object present in the predetermined region optically scanned by said optical scanning units, based on scanning angles of said optical scanning units and results of receiving light by said light receiving units;
   a storing unit for storing size information and positional information about the display screen; and
   a judging unit for judging whether the light blocking object is present within the display screen or with the non-screen area, based on the position of the light blocking object detected by the detector and size information and positional information stored in the storing unit.

2. The optical position detecting device as set forth in claim 1, comprising a virtual button, provided within the non-screen area, for accepting an instruction input for a predetermined function from outside.

3. A computer-readable recording medium having a program recorded thereon for an optical position detecting device comprising:
   a computer;
   a light retro-reflector provided outside a predetermined region, wherein the predetermined region further comprises a display screen and a non-screen area bordering the display screen;
   at least two optical transceivers, each including an optical scanning unit for angularly scanning light in a plane substantially parallel to the predetermined region and a light receiving unit for receiving reflected light from a portion of said light retro-reflector irradiated with the scanning light,
   a storing unit for storing size information and positional information about the display screen; and
   the program causing a computer to detect a position of a light blocking object present in the predetermined region optically scanned by said optical scanning units, based on scanning angles of said optical scanning units and results of receiving light by said light receiving units, and
   said recording medium being characterized in that the program includes program code means for causing the computer to make a judgment as to whether the light blocking object is present within the display screen or within the non-screen area, based on the detected position of the light blocking object and size information and positional information stored in the storing unit.

4. A computer-readable recording medium having a program recorded thereon for an optical position detecting device comprising:
   computer;
   a light retro-reflector provided outside a predetermined region, wherein the predetermined region further comprises a display screen and a non-screen area bordering the display screen;
   at least two optical transceivers, each including an optical scanning unit for angularly scanning light in a plane substantially parallel to the predetermined region and a light receiving unit for receiving reflected light from a portion of said light retro-reflector irradiated with the scanning light; and
   a virtual button provided within the non-screen area, for accepting an instruction input for a predetermined function from outside, the program causing the computer to detect pressing of said virtual button,
   said recording medium being characterized in that the program includes program code means for causing the computer to execute detection of a light blocking object present in the predetermined region optically scanned by said optical scanning units when a level of light received by said light receiving unit is lower than a predetermined level;
   program code means for causing the computer to execute calculation of a position of the light blocking object based on scanning angles of said optical scanning units and results of receiving light by said light receiving units; and
   program code means for causing the computer to execute detection of pressing of said virtual button based on the calculated position of the light blocking object within the non-screen area.

* * * * *